US011474864B2

(12) United States Patent
Qiao et al.

(10) Patent No.: US 11,474,864 B2
(45) Date of Patent: Oct. 18, 2022

(54) INDICATING RELATIVE URGENCY OF ACTIVITY FEED NOTIFICATIONS

(71) Applicant: Citrix Systems, Inc., Fort Lauderdale, FL (US)

(72) Inventors: Zongpeng Qiao, Nanjing (CN); Xiaolu Chu, Nanjing (CN); Yuran Ou, Nanjing (CN); Tie Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 262 days.

(21) Appl. No.: 16/882,851

(22) Filed: May 26, 2020

(65) Prior Publication Data

US 2021/0349757 A1 Nov. 11, 2021

Related U.S. Application Data

(63) Continuation of application No. PCT/CN2020/089364, filed on May 9, 2020.

(51) Int. Cl.
*G06F 9/48* (2006.01)
*H04L 67/00* (2022.01)

(52) U.S. Cl.
CPC ............ *G06F 9/4887* (2013.01); *H04L 67/34* (2013.01)

(58) Field of Classification Search
CPC ................................ G06F 9/4887; H04L 67/34
See application file for complete search history.

(56) References Cited

U.S. PATENT DOCUMENTS

| 8,386,929 | B2 * | 2/2013 | Zaika | G06F 3/0482 |
| | | | | 715/705 |
| 9,369,413 | B2 * | 6/2016 | Borna | H04L 51/224 |
| 10,528,228 | B2 * | 1/2020 | Seixeiro | G06F 3/167 |
| 10,554,426 | B2 * | 2/2020 | Ghods | H04L 12/1859 |
| 10,606,584 | B2 * | 3/2020 | Rao | G06F 8/71 |
| 10,769,640 | B2 * | 9/2020 | King | G06Q 30/01 |
| 11,074,555 | B2 * | 7/2021 | Shah | G06Q 10/1097 |
| 11,093,904 | B2 * | 8/2021 | Humble | G06Q 10/063116 |
| 11,113,667 | B1 * | 9/2021 | Jiang | G06F 21/62 |
| 11,144,854 | B1 * | 10/2021 | Mouawad | G06Q 10/063114 |

(Continued)

FOREIGN PATENT DOCUMENTS

| CN | 1791853 A | 6/2006 |
| CN | 102821180 A | 12/2012 |
| CN | 105284168 A | 1/2016 |

OTHER PUBLICATIONS

International Search Report and Written Opinion dated Jan. 27, 2021 in International Patent Application No. PCT/CN2020/089364.

*Primary Examiner* — Blake J Rubin
(74) *Attorney, Agent, or Firm* — Pierce Atwood LLP

(57) ABSTRACT

An example computing system is disclosed that may send a first notification to a first client device, the first notification indicating a first task to be performed by a first user with respect to a resource accessible to the computing system. The computing system may determine a second task of a second user with respect to the resource, and may further determine that the second user has completed the second task. Based at least in part on the second user having completed the second task, the computing system may determine a parameter indicating an urgency level of the first task, and may cause an indication of the urgency level to be presented on the first client device.

20 Claims, 15 Drawing Sheets

(56) References Cited

U.S. PATENT DOCUMENTS

| | | | |
|---|---|---|---|
| 11,232,383 B1* | 1/2022 | Burns, Sr. | G06Q 10/0637 |
| 2008/0313004 A1* | 12/2008 | Ryan | G06Q 10/06 705/7.17 |
| 2009/0204471 A1* | 8/2009 | Elenbaas | G06Q 10/06 726/28 |
| 2010/0250322 A1* | 9/2010 | Norwood | G06Q 10/06311 715/764 |
| 2012/0278117 A1* | 11/2012 | Nguyen | G06Q 10/06313 705/7.15 |
| 2013/0311222 A1* | 11/2013 | Chaturvedi | G06Q 10/0639 705/7.15 |
| 2014/0019191 A1* | 1/2014 | Mulji | G06Q 10/06316 705/7.26 |
| 2014/0214467 A1* | 7/2014 | Asur | G06Q 10/063112 705/7.14 |
| 2014/0297770 A1 | 10/2014 | Wada | |
| 2014/0344004 A1* | 11/2014 | Surendran | G06Q 10/06316 705/7.26 |
| 2015/0134386 A1* | 5/2015 | Jogalekar | G06Q 10/063118 705/7.13 |
| 2015/0294245 A1* | 10/2015 | Nagar | G06Q 40/12 705/7.11 |
| 2015/0363733 A1* | 12/2015 | Brown | G06Q 10/103 705/7.26 |
| 2016/0180279 A1* | 6/2016 | Koerner | G06Q 10/063114 705/7.15 |
| 2016/0260047 A1* | 9/2016 | Duggan | G06Q 10/063114 |
| 2017/0061356 A1* | 3/2017 | Haas | G06Q 10/06316 |
| 2017/0116552 A1* | 4/2017 | Deodhar | G06Q 10/0639 |
| 2017/0300844 A1* | 10/2017 | Urry | G06Q 10/06313 |
| 2018/0018610 A1* | 1/2018 | Del Balso | G06N 3/08 |
| 2018/0197125 A1* | 7/2018 | Standefer, III | G06Q 10/06311 |
| 2018/0240140 A1* | 8/2018 | Whitley | G06Q 50/22 |
| 2018/0365628 A1* | 12/2018 | Bhaskaran | G06Q 10/063112 |
| 2019/0213509 A1* | 7/2019 | Burleson | G06N 20/00 |
| 2019/0286439 A1* | 9/2019 | Rao | G06Q 10/063114 |
| 2019/0370058 A1* | 12/2019 | Gupta | G06F 9/466 |
| 2020/0074405 A1* | 3/2020 | McFarland | G06Q 10/103 |
| 2020/0097920 A1* | 3/2020 | Doctor | G06Q 10/063114 |
| 2020/0133726 A1* | 4/2020 | Curino | G06F 9/451 |
| 2020/0242540 A1* | 7/2020 | Rosati | G06Q 10/063118 |
| 2020/0293975 A1* | 9/2020 | Faulkner | G06F 16/908 |
| 2020/0411170 A1* | 12/2020 | Brown | G06N 20/00 |
| 2021/0089333 A1* | 3/2021 | Kodmad | G06F 9/451 |
| 2021/0117907 A1* | 4/2021 | Gray | G06Q 10/063118 |
| 2021/0224753 A1* | 7/2021 | Nasir | G06N 20/00 |

* cited by examiner

Notification Parameter Table

| Notification ID | Task ID | Broadcast Flag | Association Flag | Deadline Flag | Urgency Parameter Flag | Urgency Parameter | Urgency Level |
|---|---|---|---|---|---|---|---|
| Notification A | Task A | True | True | True | True | 95 | High |
| Notification B | Task B | False | True | True | True | 76 | Medium |
| Notification C | Task C | True | False | True | False | 12 | Standard |
| Notification D | Task D | False | False | False | False | 0 | Standard |
| Notification E | Task E | False | True | False | True | 0 | Standard |
| Notification F | Task F | False | False | False | True | 54 | Low |
| Notification G | Task G | False | False | True | True | 20 | Standard |
| Notification H | Task H | True | False | False | True | 10 | Standard |

FIG. 8

Task Pendency Table

| Notification ID | Initiation Time | Deadline |
|---|---|---|
| Notification A | 2020.05.10 | 2020.06.09 |
| Notification B | 2020.05.12 | 2020.05.24 |
| Notification C | 2020.05.06 | 2020.05.20 |
| Notification D | 2020.05.02 | 2020.06.01 |
| Notification E | 2020.05.15 | 2020.06.15 |
| Notification F | 2020.05.22 | 2020.06.22 |
| Notification G | 2020.05.12 | 2020.05.27 |
| Notification H | 2020.05.09 | 2020.05.19 |

| Broadcast Group ID | Task ID | User ID | Complete? |
|---|---|---|---|
| Group 1 | Task A | 1 | No |
| Group 1 | Task B | 2 | Yes |
| Group 1 | Task C | 3 | Yes |
| Group 1 | Task D | 4 | Yes |
| Group 2 | Task E | 1 | Yes |
| Group 2 | Task F | 2 | No |
| Group 2 | Task G | 3 | No |
| Group 2 | Task E | 4 | No |

Broadcast Task Completion Table

| Association Group | Task ID | User ID | Complete? |
|---|---|---|---|
| Group 3 | Task F | 1 | No |
| Group 3 | Task G | 5 | Yes |
| Group 3 | Task C | 6 | Yes |
| Group 3 | Task H | 7 | Yes |
| Group 3 | Task I | 8 | Yes |
| Group 3 | Task J | 9 | Yes |
| Group 4 | Task K | 2 | No |
| Group 4 | Task L | 3 | No |

Association Task Completion Table

FIG. 10

INDICATING RELATIVE URGENCY OF ACTIVITY FEED NOTIFICATIONS

CROSS-REFERENCE TO RELATED APPLICATIONS

This application is a continuation of and claims the benefit under 35 U.S.C. § 120 and 35 U.S.C. § 365(c) to International Application PCT/CN2020/089364, entitled INDICATING RELATIVE URGENCY OF ACTIVITY FEED NOTIFICATIONS, with an international filing date of May 9, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed provides a streamlined mechanism for notifying a user of various application events in need of attention and allowing the user to efficiently act on such events, without requiring the user to switch context and separately launch the respective applications to take actions with respect to the different events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computing system sends a first notification to a first client device, the first notification indicating a first task to be performed by a first user with respect to a resource accessible to the computing system. The computing system determines a second task of a second user with respect to the resource, and further determines that the second user has completed the second task. Based at least in part on the second user having completed the second task, the computing system determines a parameter indicating an urgency level of the first task, and causes an indication of the urgency level to be presented on the first client device.

In some of the disclosed embodiments, a computing system sends a notification to a client device, the notification indicating a first task to be performed with respect to a resource accessible to the client device. The computing system determines an initiation time of the first notification and a deadline for completing the first task. Based at least in part on the initiation time, the deadline, and a current time, the computing system determines a parameter indicating an urgency level of the first task, and causes an indication of the urgency level to be presented on the client device.

In some of the disclosed embodiments, a computing system comprises at least one processor, and at least one computer readable medium. The at least one computer-readable medium is encoded with instructions which, when executed by the at least one processor, cause the computing system to send a first notification to a first client device, the first notification indicating a first task to be performed by a first user with respect to a resource accessible to the computing system, to identify a second task of a second user with respect to the resource, to determine that the second user has completed the second task, to determine a parameter indicating an urgency level of the first task, the parameter being based at least in part on the second user having completed the second task, and to cause an indication of the urgency level to be presented on the first client device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8 shows an example notification parameter table that may be stored in the database(s) shown in FIG. 6;

FIG. 9 shows an example broadcast task completion table that may be stored in the database(s) shown in FIG. 6;

FIG. 10 shows an example association task completion table that may be stored in the database(s) shown in FIG. 6;

FIG. 11 shows an example task pendency table that may be stored in the database(s) shown in FIG. 6;

DETAILED DESCRIPTION

Figure 1A:
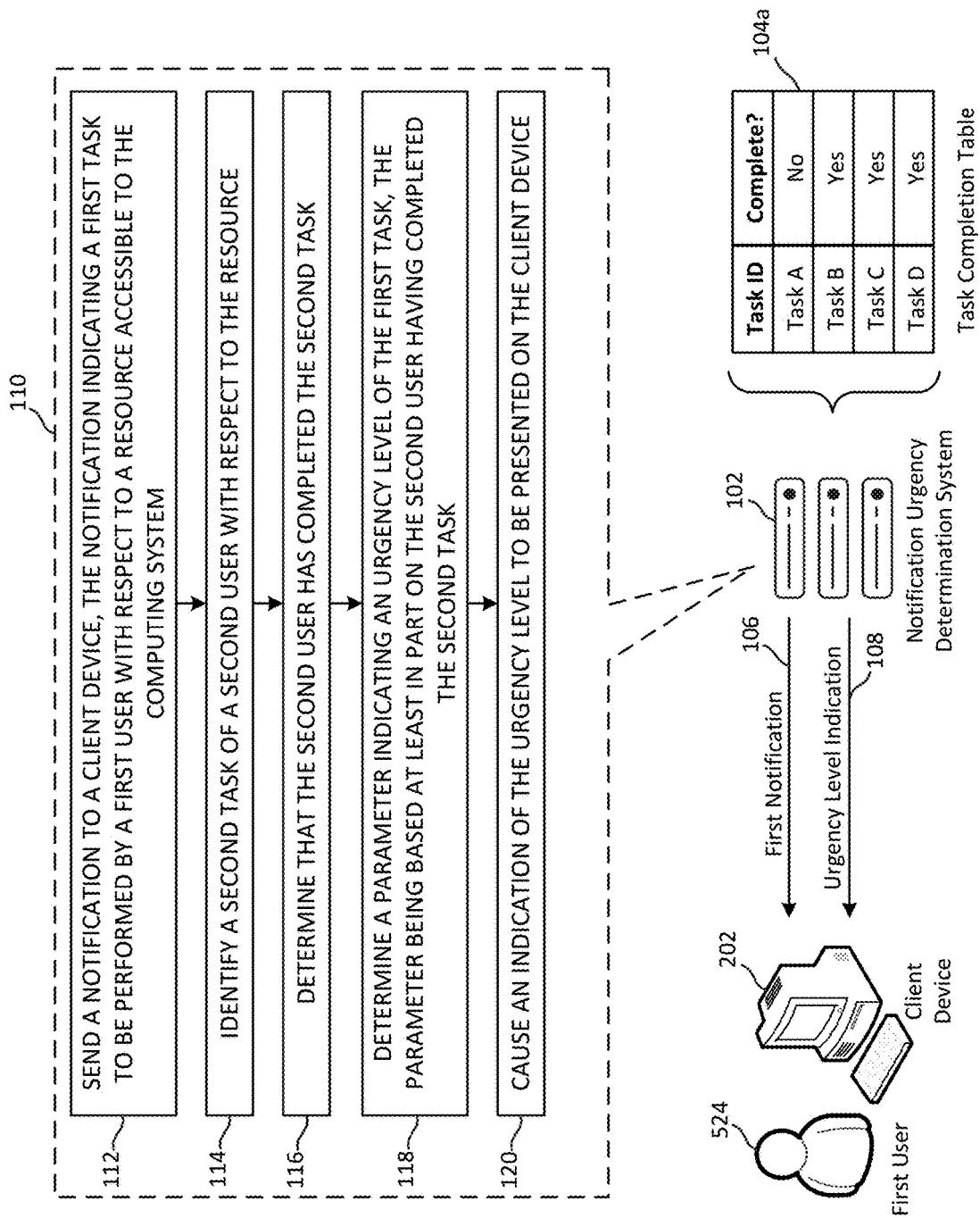
FIG. 1A shows a first example implementation of a notification urgency determination system configured in accordance with some embodiments of the present disclosure.

For purposes of reading the description of the various embodiments below, the following descriptions of the sections of the specification and their respective contents may be helpful:

Section A provides an introduction to example embodiments of notification urgency determination systems in accordance with the present disclosure;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of example embodiments of the notification urgency determination systems that were introduced above in Section A; and Section G describes example implementations of methods, systems/devices, and computer-readable media in accordance with the present disclosure.

A. Introduction to Illustrative Embodiments of Systems and Methods for Indicating the Relative Urgency of Activity Feed Notifications An intelligent activity feed, such as that offered by the Citrix Workspace™ family of products, provides significant benefits, as it allows a user to respond to application-specific events generated by disparate systems of record, without requiring the user to switch context and separately launch the respective applications to take actions with respect to the different events. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes (in connection with FIGS. 5C and 5D), a user 524 may operate a client device 202 so as to interact with "microapps" corresponding to particular functionalities of a variety of systems of record 526, and such microapps may, in turn, interact with the systems of record 526, e.g., via application programming interfaces (APIs) of such systems, on behalf of the user 524.

More specifically, and as described in more detail in Section E, a microapp service 528 (shown in FIG. 5C) may periodically request a sync with a data integration provider service 530, so as to cause active data to be pulled from the systems of record 526. In some implementations, for example, the microapp service 528 may retrieve encrypted service account credentials for the systems of record 526 from a credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to an analytics service 536 for processing. The analytics service 536 may create notifications (e.g., targeted scored notifications) and send such notifications to the notification service 538. The notification service 538 may store the notifications in a database to be later served in an activity feed and/or may send the notifications out immediately to the client 202 as a push notification to the user 524.

Figure 5A:
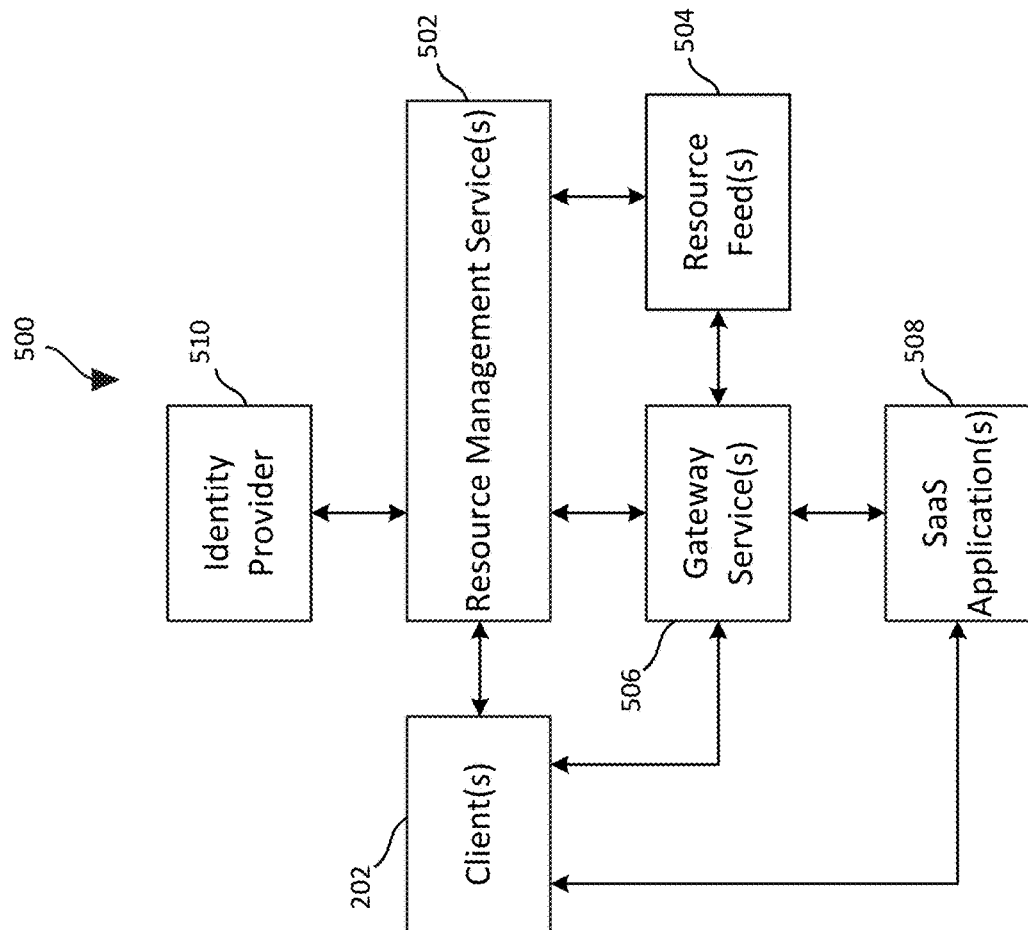
FIG. 5A is a block diagram of an example system in which resource management services may manage and streamline access by clients to resource feeds (via one or more gateway services) and/or software-as-a-service (SaaS) applications.
Figure 5B:
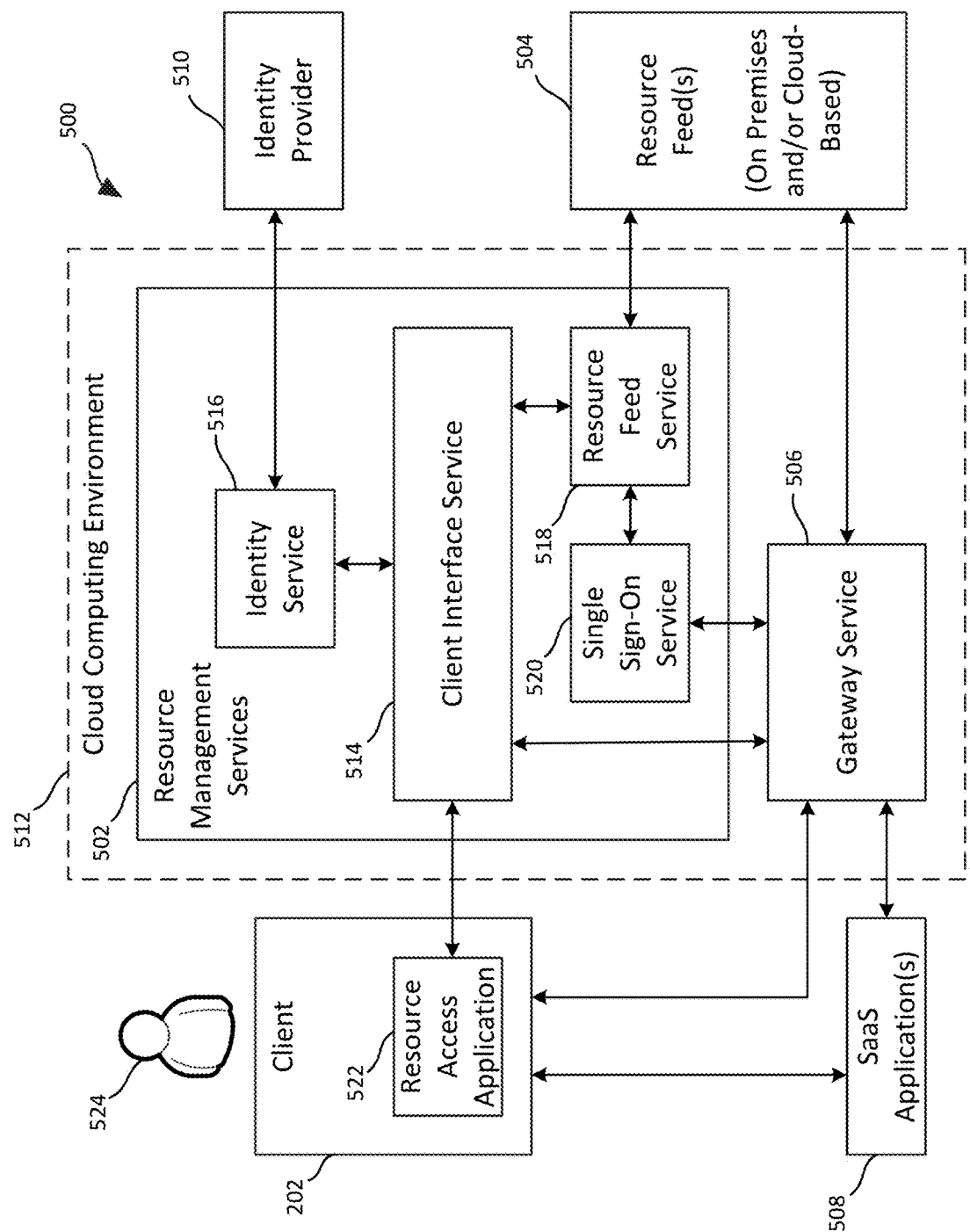
FIG. 5B is a block diagram showing an example implementation of the system shown in FIG. 5A in which various resource management services as well as a gateway service are located within a cloud computing environment.
Figure 5C:
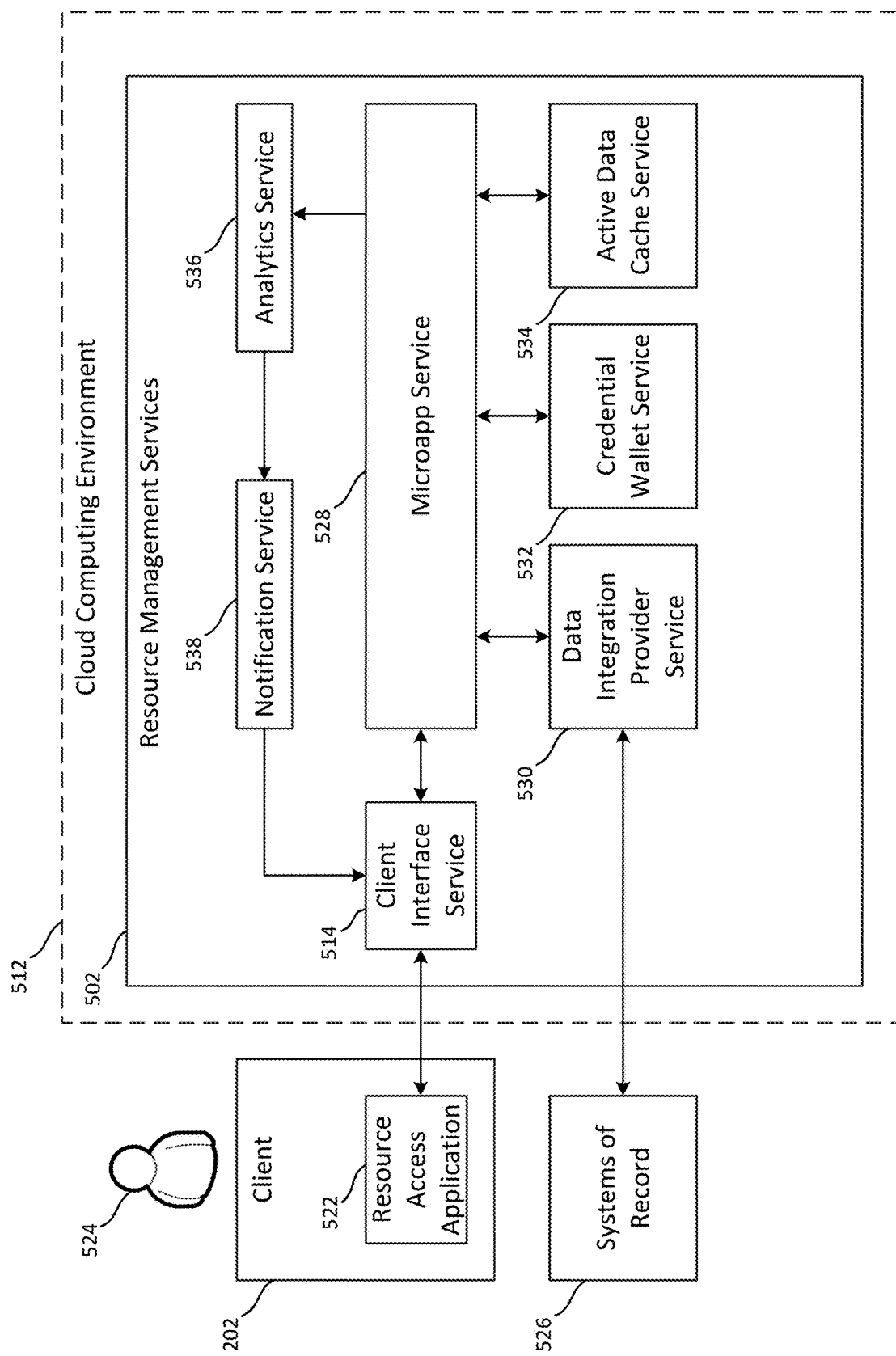
FIG. 5C is a block diagram similar to that shown in FIG. 5B but in which the available resources are represented by a single box labeled "systems of record," and further in which several different services are included among the resource management services.
Figure 5D:
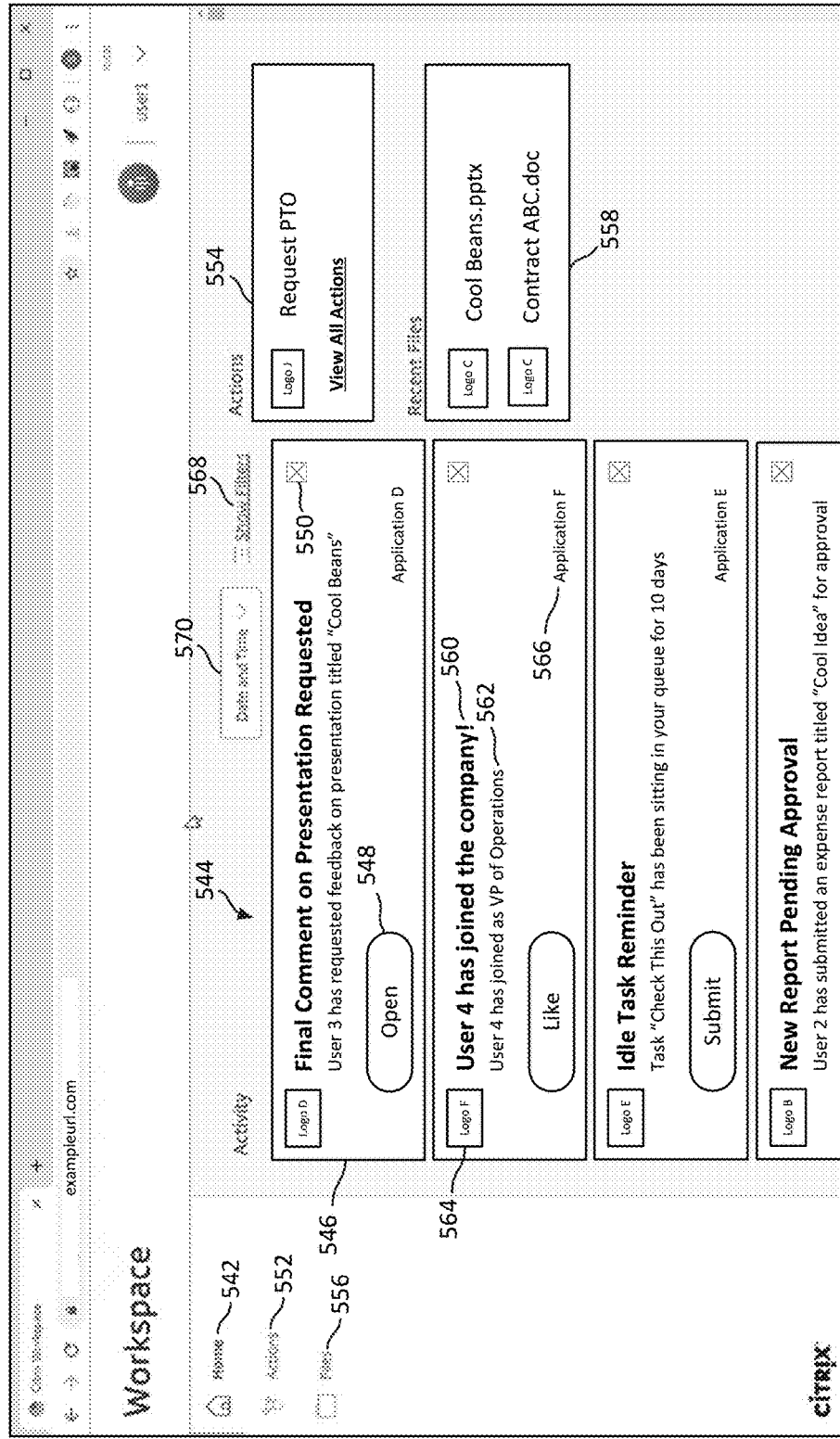
FIG. 5D shows how a display screen may appear when an intelligent activity feed feature of a multi-resource management system, such as that shown in FIG. 5C, is employed.

FIG. 5D, which is also described in more detail in Section E, shows how a display screen 540 presented by a resource access application 522 (shown in FIG. 5C) may appear when an intelligent activity feed feature is employed and a user 524 is logged on to the system. As shown in FIG. 5D, an activity feed 544 may be presented on the display screen 540 that includes a plurality of notifications 546 about respective events that occurred within various applications to which the user 524 has access rights.

As noted above, in some implementations, in addition to creating the notifications 546 that are to be sent to client devices 202, the analytics service 536 may assign scores to such notifications 546 that may be used for sorting purposes. Such scores may, for example, indicate a determined relevancy of the task indicated by the notification 546 to the user 524 operating the resource access application 522. As explained below in connection with FIG. 5D, in some implementations, the user 524 may operate the user interface element 570 to control the manner in which the notifications 546 in the activity feed 544 are sorted, such as by selecting a "date and time" mode (as shown in FIG. 5D) in which the notifications 546 may be sorted in accordance with the date and time they were created, by selecting a "relevancy" mode (not illustrated) in which the notifications may be sorted based on relevancy scores assigned to them by the analytics service 536, and/or by selecting an "application" mode (not illustrated) in which the notifications 546 may be sorted by application type.

Although the above system for presenting and sorting notifications 546 works quite well in most situations, the inventors have recognized and appreciated that circumstances may arise in which a user might not timely respond to a notification because the user is not made aware that the notification has become more urgent since it was initially sent, e.g., due to actions of others and/or the passage of time. As one illustrative example, notifications 546 may be sent to a large number of employees in an organization indicating that the employees are to respond to one or more questions by a particular date, e.g., within two weeks of when the notifications were initiated. Such notifications 546 may, for example, have been generated based on the analysis of emails or other messages that were sent from a manager to the employees. As explained in more detail below, in some implementations, information concerning such emails or other messages may be retrieved from Microsoft Outlook or another system of record 526 via the data integration provider service 530. In some instances, failure to provide timely responses to such questions, e.g., by accessing a survey by clicking on a link in the notification or the email that prompted the notification, can cause significant problems, such as when responses are needed to satisfy a regulatory or contractual obligation. In other instances, failure to provide timely responses can be less consequential, such as when employees have been asked to provide feedback on an event, to accept or decline an event invitation, etc. In either circumstance, however, such failures to respond can necessitate one or more follow up actions or communications from the individual seeking the responses. Such follow up can take a significant amount of time and can thus reduce employee productivity. Moreover, even when a user appreciates the existence of a response deadline when a notification is first presented, the user may be busy with another task or may opt to begin working on a higher priority task rather than immediately addressing the task indicated by the notification. In such a circumstance, the user may forget or lose track of the indicated deadline. This can be particularly problematic when the user also dismisses the notification 546 from the user's activity feed 544, perhaps thinking that he or she will remember to access the application responsible for triggering the notification 546 and answer the question(s) at a later time.

As another example, a user may be assigned one task among a group of several related tasks (e.g., one of several issues in a JIRA epic). The user may not appreciate that all, or nearly all, of the other individuals to whom the other related tasks were assigned have already completed their tasks. The user may thus prioritize other work and delay performing the particular task the user has been assigned and, in turn, might unnecessarily delay the completion of a project by an entire team. As a general matter, users are likely to approach pending tasks with an increased sense of urgency if they are aware that they are holding back completion of a project. In the current system, however, that information is not communicated to notification recipients.

Offered is a system capable of detecting an increase in an urgency level of a task indicated by a notification, and communicating an indication of such increased urgency level to a user so as to allow the user to respond accordingly. In some embodiments, for example, a number of other individuals who have completed a common task indicated by a broadcasted notification and/or a number of other individuals who have completed different but related tasks (e.g., other tasks for the same project) may be tracked, and the urgency level of a notification may be increased as additional individuals are determined to have completed such tasks. In some implementations, an amount of time remaining before a response deadline may additionally or alternatively be taken into account when detecting the increased urgency level of a task indicated by a notification. The factors that can be taken into account when assessing an urgency level of a particular task may depend on the information that is available to the system 102. In some implementations, notifications 546 may be categorized based on the types of data that is available concerning the tasks they indicate, and urgency levels may be determined in different ways, e.g., using different equations, for different categories of notifications 546.

In some implementations, a parameter indicative of a current urgency level of a task indicated by a notification 546 may be determined based upon a ratio between (A) a number of individuals who have completed the same task, e.g., a broadcasted questionnaire (or, alternatively, the number of individuals who have not yet completed the task), and (B) the total number of individuals who are expected to complete the task. For example, if one hundred individuals are expected to complete the task and seventy individuals have completed it, the ratio between individuals who have completed the task to the total number of individuals would be "0.7" or seventy percent.

In some implementations, a parameter indicative of a current urgency level of a task indicated by a notification 546 may additionally or alternatively be determined based upon a ratio between (A) a number of related tasks (e.g., respective issues in a JIRA epic) that have been completed (or, alternatively, the number of related tasks that have not yet been completed), and (B) the total number of related tasks. For example, if nine tasks are determined to be related to the task under consideration and six such related tasks have been completed, the ratio between completed tasks and the total number of tasks would be "0.6" or sixty percent.

In some implementations, a parameter indicative of a current urgency level of a task indicated by a notification 546 may additionally or alternatively be determined based upon a ratio between (A) an amount of time that has elapsed since the notification 546 was initiated (or, alternatively, an amount of time remaining before a deadline set for completing the task indicated by the notification), and (B) an amount of time between when the notification was initiated and the deadline. In some implementations, time units of days may be used for such a calculation. For example, if a notification 546 indicated a response deadline ten days after it was initiated, after eight days the ratio between an amount of time that has elapsed since the notification 546 was initiated (i.e., eight days) and an amount of time between when the notification was initiated and the deadline (i.e., ten days) would "0.8" or eighty percent.

In some implementations, a parameter indicative of an urgency level of a task indicated by a notification 546 may be based on a combination of two or more "sub-parameters," such as the ratios described above. As explained in more detail below, in some implementations, different weighting factors may be applied to each such sub-parameter, so that the respective sub-parameters are caused to influence the determined urgency parameter by differing degrees.

The above noted parameters indicative of urgency levels of tasks indicated by notifications 546 may be referred to as an "urgency parameters." No matter how such an urgency parameter is calculated, in some implementations, the urgency level of a task indicated by a notification 546 may be determined based on the current value of the urgency parameter. For example, in implementations in which the urgency parameter is calculated so as to fall somewhere between zero and one hundred percent, when the urgency parameter is less than thirty percent, the notification 546 may be assigned a "standard" urgency level, when the urgency parameter is between thirty and sixty percent, the notification 546 may be assigned a "low" urgency level, when the urgency parameter is between sixty and ninety percent, the notification 546 may be assigned a "medium" urgency level, and when the urgency parameter is greater than ninety percent, the notification 546 may be assigned a "high" urgency level.

An indication of the determined urgency level of a notification 546 may be presented on a client device 202 in any of a number of ways. In some implementations, for example, the indication can be presented as a color difference between borders or other portions of respective notifications 546. For example, notifications 546 having a "standard" urgency level may be surrounded by a grey border, notifications 546 having a "low" urgency level may be surrounded by a green border, notifications 546 having a "medium" urgency level may be surrounded by a yellow border, and notifications 546 having a "high" urgency level may be surrounded by a red border. In some implementations, different icons or other symbols may additionally or alternatively be displayed in association with respective notifications 546 to indicate different urgency levels. In some implementations, such indications may additionally or alternatively be provided by presenting notifications having higher urgency levels (e.g., the "high" urgency level noted above) within a particular region of display screen or within a fixed location within the activity feed 544 (e.g., a location that does not change when the other displayed notifications 546 are scrolled). In some implementations, such indications may additionally or alternatively be presented by altering a manner in which the notifications 546 in the activity feed 544 are sorted, either automatically, e.g., by using the calculated urgency parameter to adjust the score assigned by the analytics service 536, or in response to user input, e.g., when the user 524 operates the user interface element 570 (shown in FIG. 5D) to select "urgency" as a sorting option, or when the user 524 selects a filter option, e.g., via a user interface element 568, so as to view notifications 546 that have been assigned one or more particular urgency levels, e.g., to view only "high" urgency level notifications. Selecting an "urgency" sorting option may, for example, cause the notifications 546 having the highest urgency parameters (calculated as discussed above) and/or the highest urgency levels to appear closer to the top of the activity feed 544. In some implementations, such urgency level indications may additionally or alternative be presented by causing the notification service 538 to "re-push" the notification to the client device 202. In some implementations, for example, a user 524 may have dismissed a notification 546 from the activity feed 544. Upon detecting an increased urgency level for such a notification 546, the notification service 538 may be instructed to send another instance of the previously-dismissed notification 546 to the client device 202.

Figure 1B:
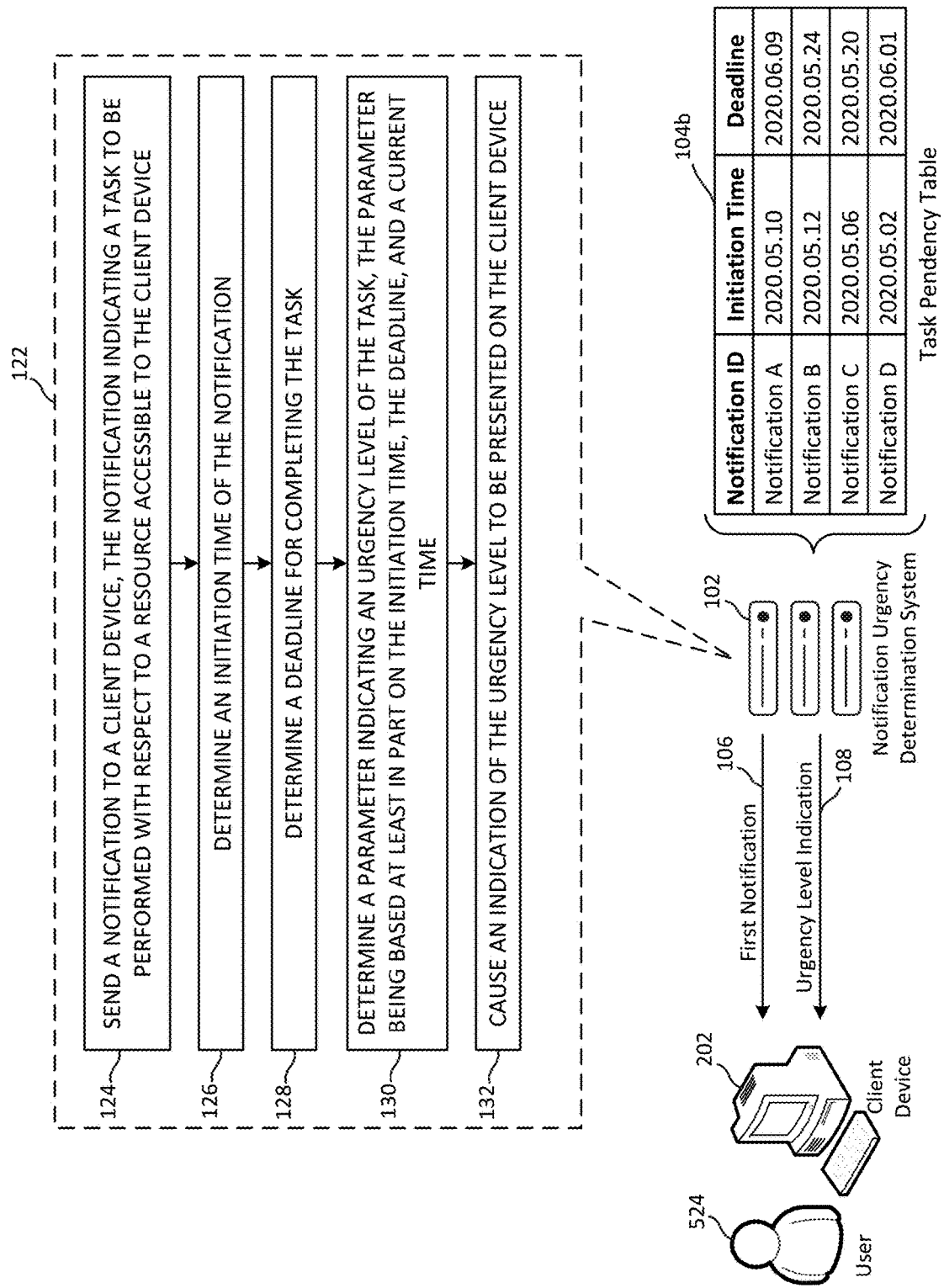
FIG. 1B shows a second example implementation of a notification urgency determination system configured in accordance with some embodiments of the present disclosure.

FIGS. 1A and 1B show example implementations of a notification urgency determination system 102 configured in accordance with some embodiments of the present disclosure. In some implementations, the notification urgency determination system 102 may be included amongst, or operate in conjunction with, the resource management service(s) 502 described below in connection with FIGS. 5A-D. As shown, in some embodiments, the notification urgency determination system 102 may reference information stored in one or more tables 104a, 104b to determine an urgency level of a task indicated by a first notification 106, 546 sent to a client device 202 (also shown in FIGS. 5A-C) operated by a first user 524 (also shown in FIGS. 5B & 5C). In the example shown in FIG. 1A, a "task completion" table 104a includes information indicating whether particular tasks have been completed. One of the tasks represented in the table 104a, e.g., "Task A," may be the task that is indicated by the first notification 106, 546. The other tasks represented in the table may be the same task that is to be performed by multiple individuals (e.g., resulting from a broadcasted message) and/or may be different tasks that are determined to be related to the task indicated by the first notification 106, 546. In the example shown in FIG. 1B, a "task pendency" table 104b includes information indicating times at which respective notifications 106, 546 were initiated as well as deadlines for completing the tasks indicated by those notifications 106, 546. The entries for "Notification A" in the table 104b may, for example, correspond to the first notification 106, 546 that is sent to the client device 202.

As illustrated in FIGS. 1A-B, based on the information in either or both of the tables 104a-b, the notification urgency determination system 102 may determine a current urgency level of the task indicated by the first notification 106, 546, and may cause the client device 202 to present an indication 108 of that determined urgency level, such as by causing the client device 202 to color code a portion of the first notification 106, 546 or by re-pushing the first notification 106, 546 to the client device 202. The manner in which entries in the table(s) 104a, 104b may be selected, updated, and used to assess the current urgency level of notifications 106, 546 is described in detail below in connection with FIGS. 6-14.

As shown in FIG. 1A, in some implementations, the notification urgency determination system 102 may be configured to perform a routine 110 to determine the urgency level indication 108 and to cause that indication to be presented on the client device 202.

At a step 112 of the routine 110, the notification urgency determination system 102 may send the notification 106, 546 to the client device 202. As noted, the notification 106, 546 may indicate a task that the first user 524 is to perform with respect to a resource accessible to the notification urgency determination system 102.

At a step 114 of the routine 110, the notification urgency determination system 102 may identify a second task of a second user with respect to the resource. As noted above, such a second task may be the same as the first task (e.g., resulting from a broadcasted message) or may be different than, but related to, the first task.

At a step 116 of the routine 110, the notification urgency determination system 102 may determine that the second user has completed the second task. Such a determination may be made, for example, by referencing the entries in the task completion table 104a.

At a step 118 of the routine 110, the notification urgency determination system 102 may determine a parameter indicating an urgency level of the first task, which parameter may be based at least in part on the second user having completed the second task, e.g., based on the entries in the task completion table 104a.

At a step 120 of the routine 110, the notification urgency determination system 102 may cause the urgency level indication 108 to be presented on the client device 202.

As shown in FIG. 1B, in some implementations, the notification urgency determination system 102 may additionally or alternatively be configured to perform a routine 122 to determine the urgency level indication 108 and to cause that indication to be presented on the client device 202.

At a step 124 of the routine 122, the notification urgency determination system 102 may send the notification 106, 546 to the client device 202. As noted, the notification 106, 546 may indicate a task that the first user 524 is to perform with respect to a resource accessible to the notification urgency determination system 102.

At a step 126 of the routine 122, the notification urgency determination system 102 may determine an initiation time of the notification 106, 546. The initiation time may, for example, indicate a time at which the notification 106, 546 was first created or a time at which the notification 106, 546 was first sent to the client device 202. In some implementations, the initiation time may be determined by referencing entries in the task pendency table 104b.

At a step 128 of the routine 122, the notification urgency determination system 102 may determine a deadline for completing the task indicated by the notification 106, 546.

Such a determination may be made, for example, by referencing the entries in the task pendency table 104b.

At a step 130 of the routine 122, the notification urgency determination system 102 may determine a parameter indicating an urgency level of the task indicated by the notification 106, 546, which parameter may be based at least in part on the initiation time, the deadline, and a current time. As noted above, in some implementations, such a parameter may be based at least in part on a determined ratio between (A) an amount of time that has elapsed since the notification 106, 546 was initiated (or, alternatively, an amount of time remaining before a deadline set for completing the task indicated by the notification 106, 546), and (B) an amount of time between when the notification 106, 546 was initiated and the deadline.

At a step 132 of the routine 122, the notification urgency determination system 102 may cause the urgency level indication 108 to be presented on the client device 202.

Additional details and example implementations of embodiments of the present disclosure are set forth below in Section F, following a description of example systems and network environments in which such embodiments may be deployed.

B. Network Environment

Figure 2:
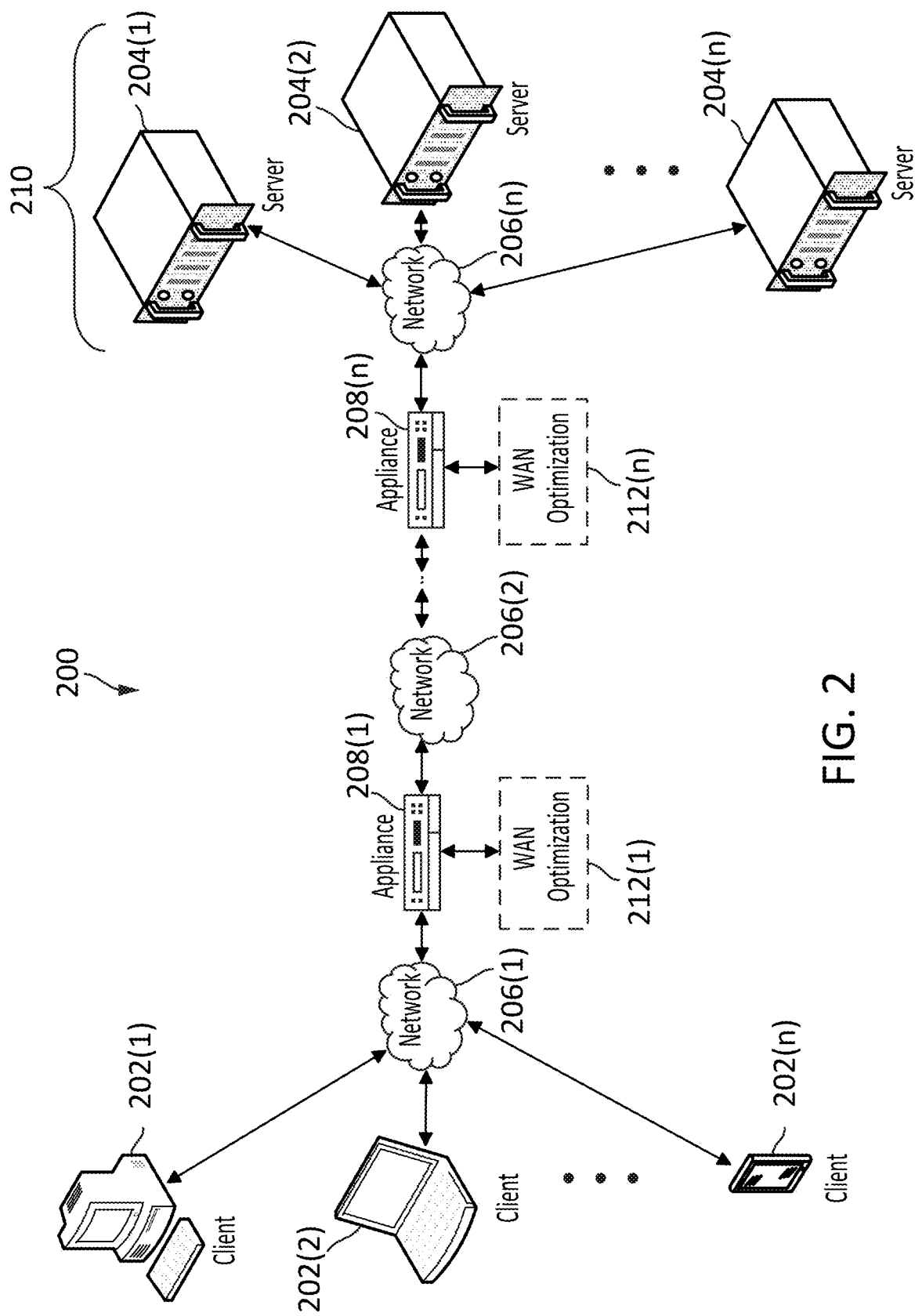
FIG. 2 is a diagram of a network environment in which some embodiments of the notification urgency determination system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
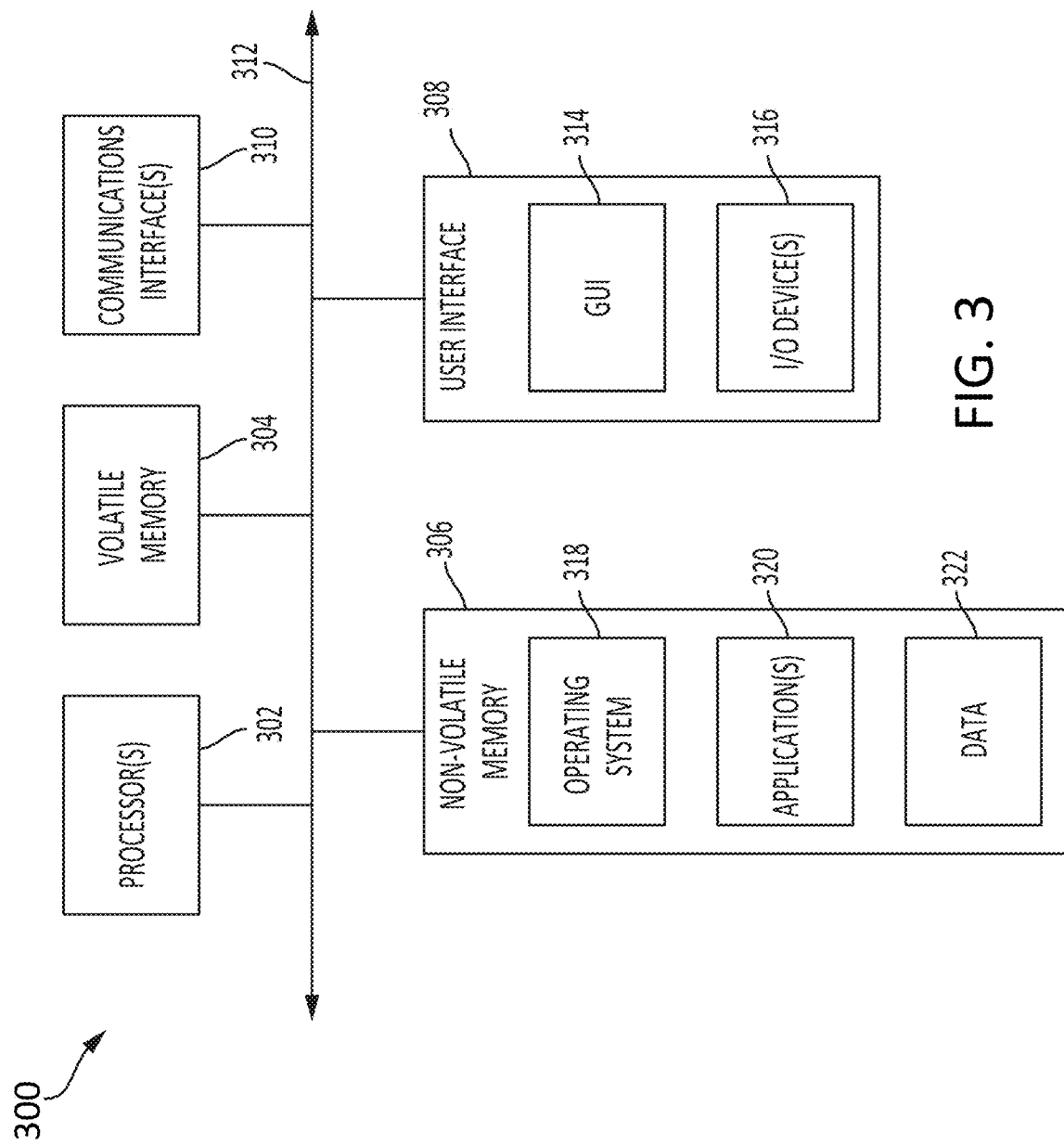
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
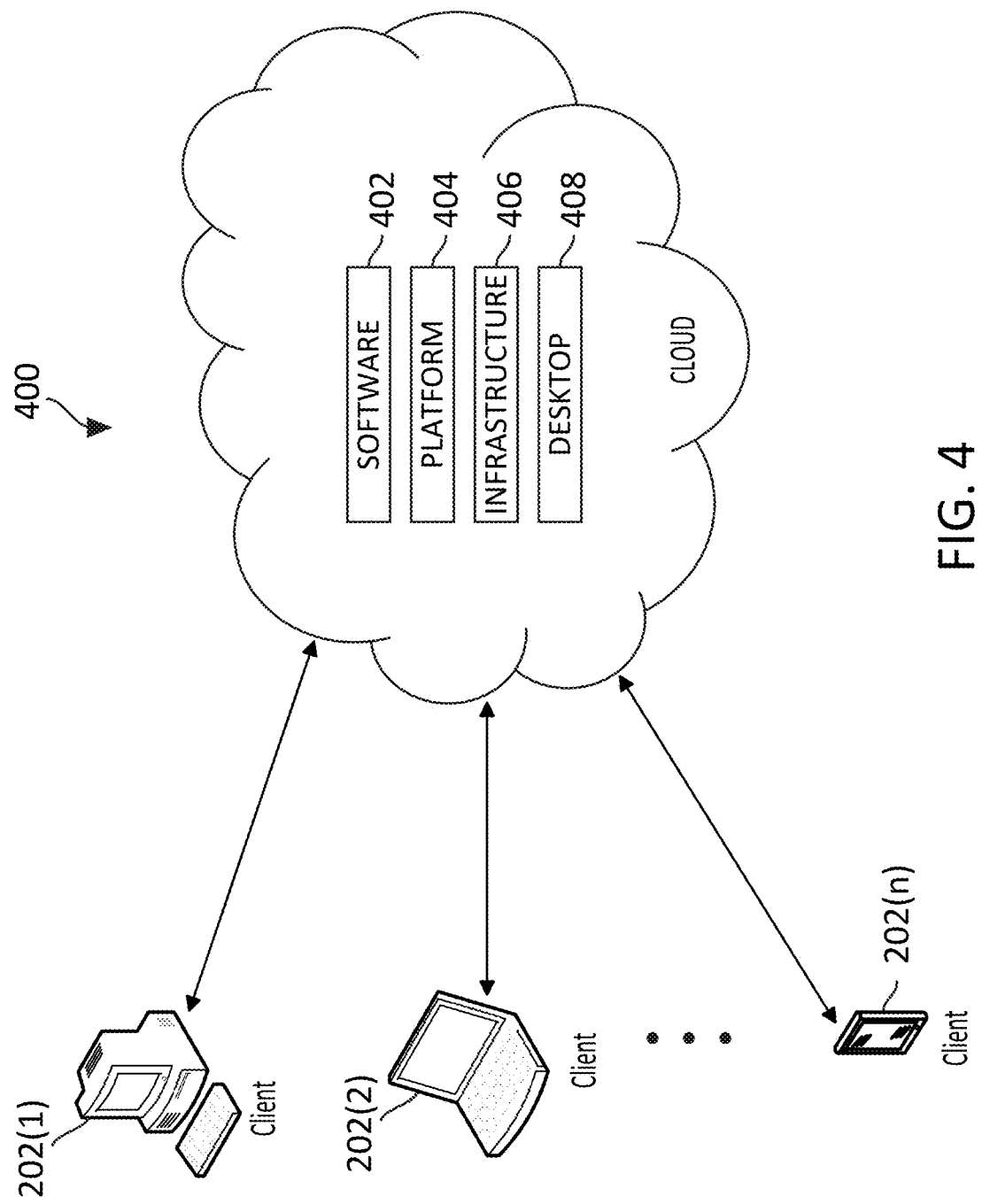
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAutXXH2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAutXXH2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted OautXXH2 token for the system of record for which the action is to be invoked, and may send the action to the data integration provider service 530 together with the encrypted OAutXXH2 token. The data integration provider service 530 may then decrypt the OAutXXH2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of Systems and Methods for Indicating the Relative Urgency of Activity Feed Notifications As discussed above in Section A, in some embodiments, a notification urgency determination system 102 (shown in FIGS. 1A & 1B) may determine the relative urgency levels of tasks indicated by respective notifications 106, 546 for an activity feed 544 presented on a client device 202, and may cause the client device 202 to present indications, e.g., urgency level indication 108, of such urgency levels so as to allow the user 524 of the client device 202 to respond accordingly. As was described in Section A, in some implementations, entries in one or more tables 104a, 104b may be populated and used to assess the urgency levels of respective tasks. Further, as was also noted in Section A, different factors may be taken into account when assessing the urgency levels of different types of tasks.

Figure 6:
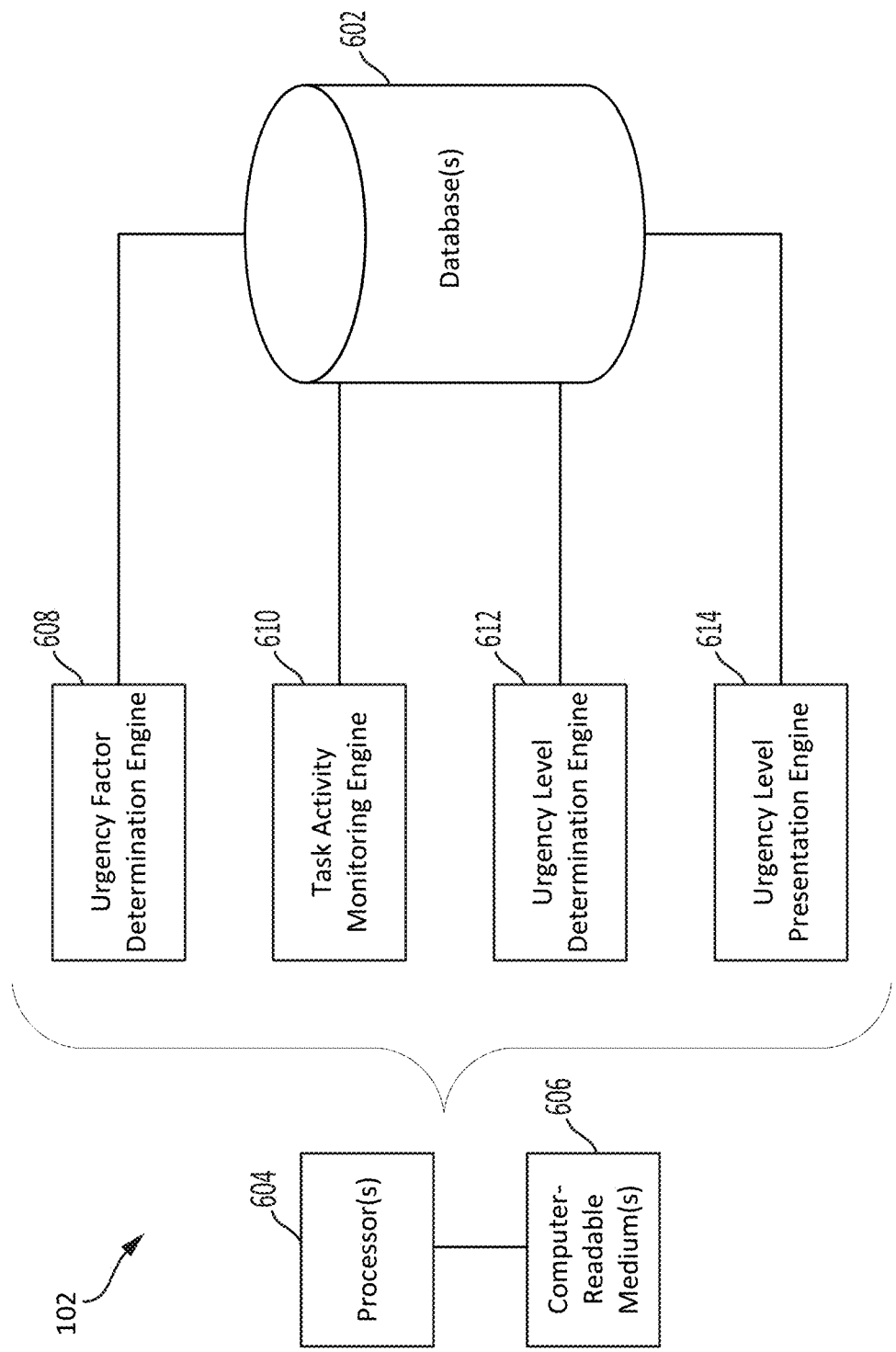
FIG. 6 is a block diagram showing example components that may be included in the notification urgency determination systems shown in FIGS. 1A and 1B.

FIG. 6 shows example components that may be included within the notification urgency determination system 102 to enable the system 102 to determine urgency level indications, e.g., the urgency level indication 108 shown in FIGS. 1A & 1B, for respective notifications 106, 546, and to present such indications on one or more client devices 202. As shown, in some implementations, the system 102 may include one or more databases 602, one or more processors 604 and one or more computer readable mediums 606. The processor(s) 604 and computer readable medium(s) 606 may be disposed at any of various locations with respect to the client device(s) 202. In some implementations, some or all of the processor(s) 604 and computer readable medium(s) 606 may be located remote from the client device(s) 202 and may communicate with the client device(s) 202 over one or more networks, such as the networks 206 described above in connection with FIG. 2. In some embodiments, for example, some or all of the processor(s) 604 and computer readable medium(s) 606 may be included within, or operate in conjunction with, the resource management service(s) 502 described above in connection with FIGS. 5A-5C. In some implementations, one or more of the processor(s) 604 and computer readable medium(s) 606 may additionally or alternatively be included within one or more of client device(s) 202. Examples of particular functionalities of the system 102 that may be employed within the resource management service(s) 502 and/or the client device(s) 202 are described below.

As illustrated in FIG. 6, regardless of where the processor(s) 604 and computer readable medium(s) 606 are physically located, those components may, in some embodiments, implement several functional engines, including, for example, an urgency factor determination engine 608, a task activity monitoring engine 610, an urgency level determination engine 612, and an urgency level presentation engine 614.

Figure 7:
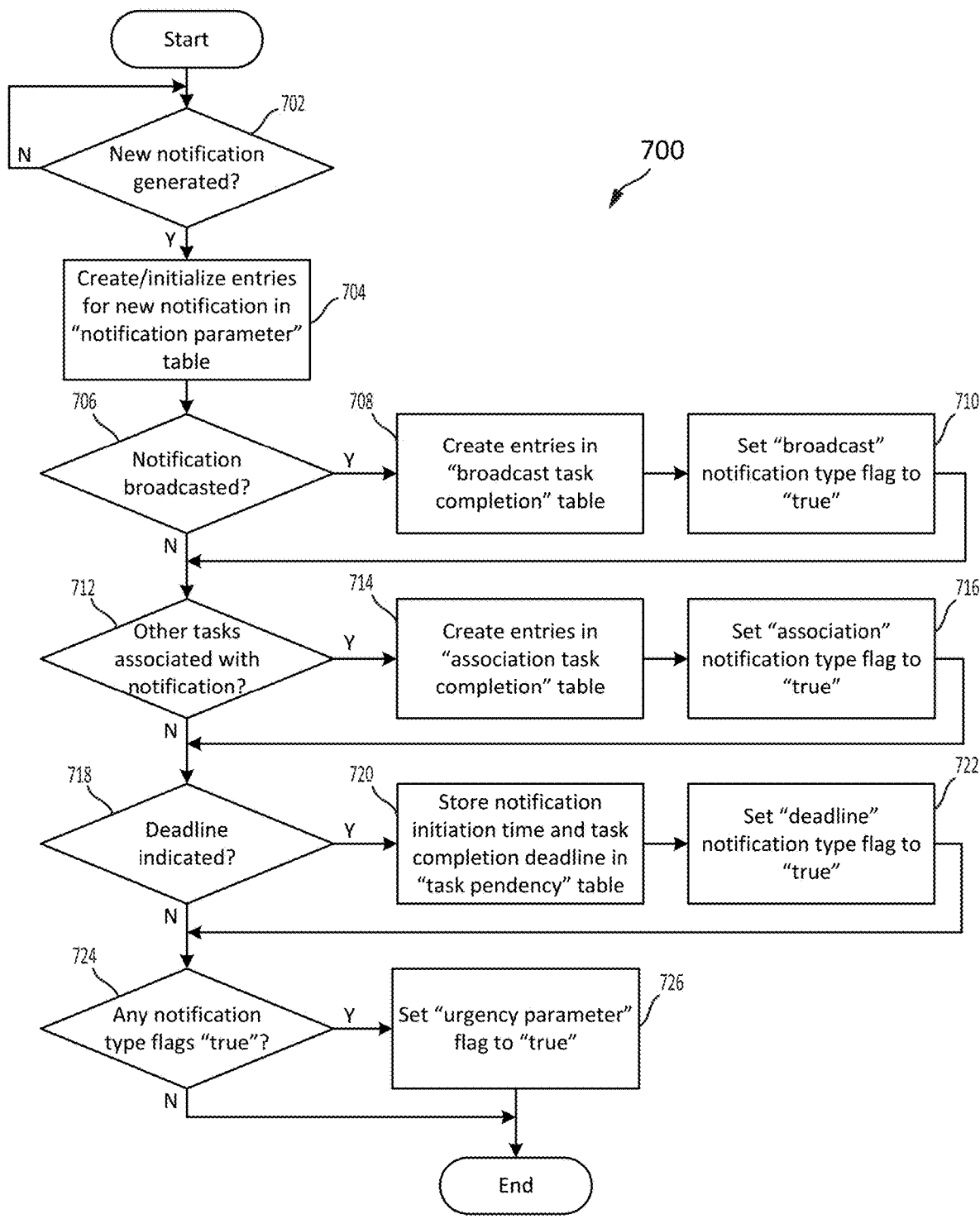
FIG. 7 is flowchart showing an example routine that may be performed by the urgency factor determination engine shown in FIG. 6.

The urgency factor determination engine 608 may categorize notifications 106, 546 into particular notification "types" so as to determine the factors that are to be taken into account when assessing the urgency levels of the tasks they indicate. The urgency factor determination engine 608 may also create appropriate table entries, e.g., in the database(s) 602, for use by the other engines 610, 612, and 614, as discussed below. FIG. 7, which is described in more detail below, shows an example routine 700 that may be performed by the urgency factor determination engine 608. Examples of table entries that may be created as a result of the routine 700 are shown in tables 800, 900, 1000 and 1100 illustrated in FIGS. 8, 9, 10 and 11, respectively.

Figure 12:
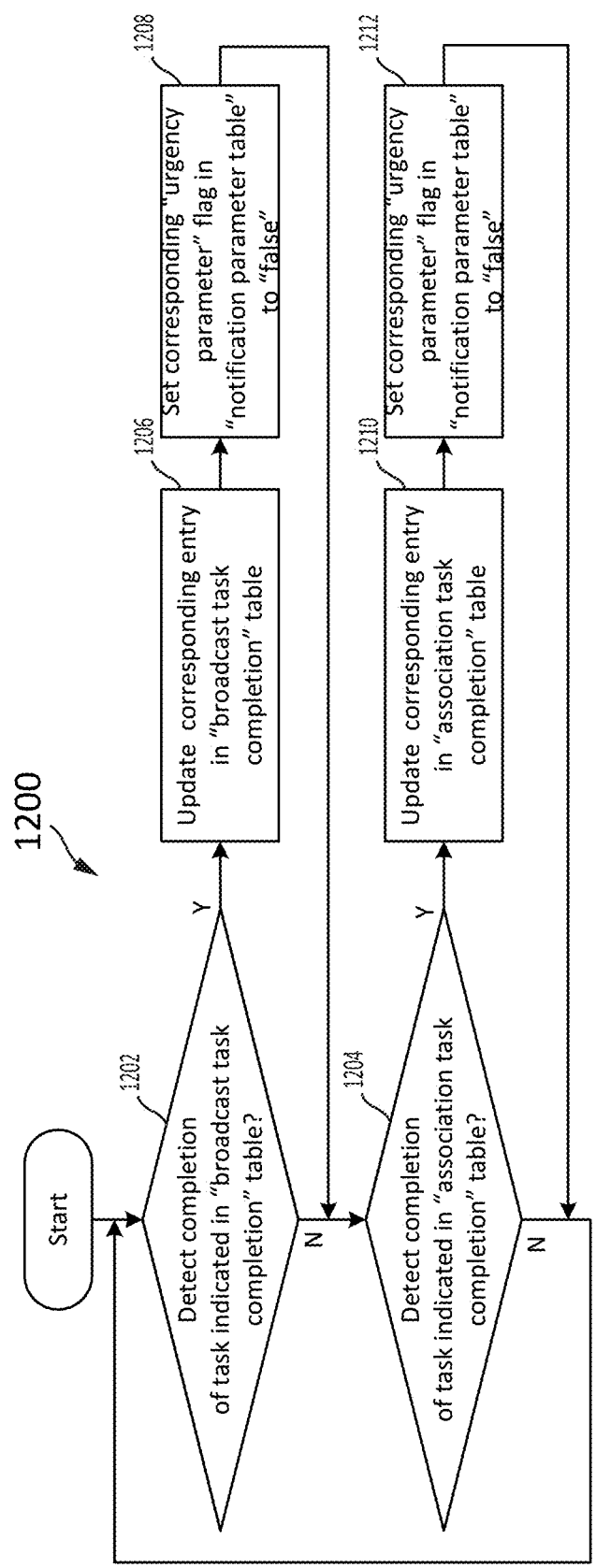
FIG. 12 is flowchart showing an example routine that may be performed by the task activity monitoring engine shown in FIG. 6.

The task activity monitoring engine 610 may monitor activity at the server level, e.g., within one or more of the resource management service(s) 502 shown in FIGS. 5A-C, and/or at the client level, e.g., by one or more of the client devices 202, to detect when users complete the various tasks indicated in the tables 900 and 1000. Upon detecting the completion of such tasks, the task activity monitoring engine 610 may update corresponding entries in the tables 900 and 1000 accordingly. FIG. 12, which is described in more detail below, shows an example routine 1200 that may be performed by the task activity monitoring engine 610.

Figure 13:
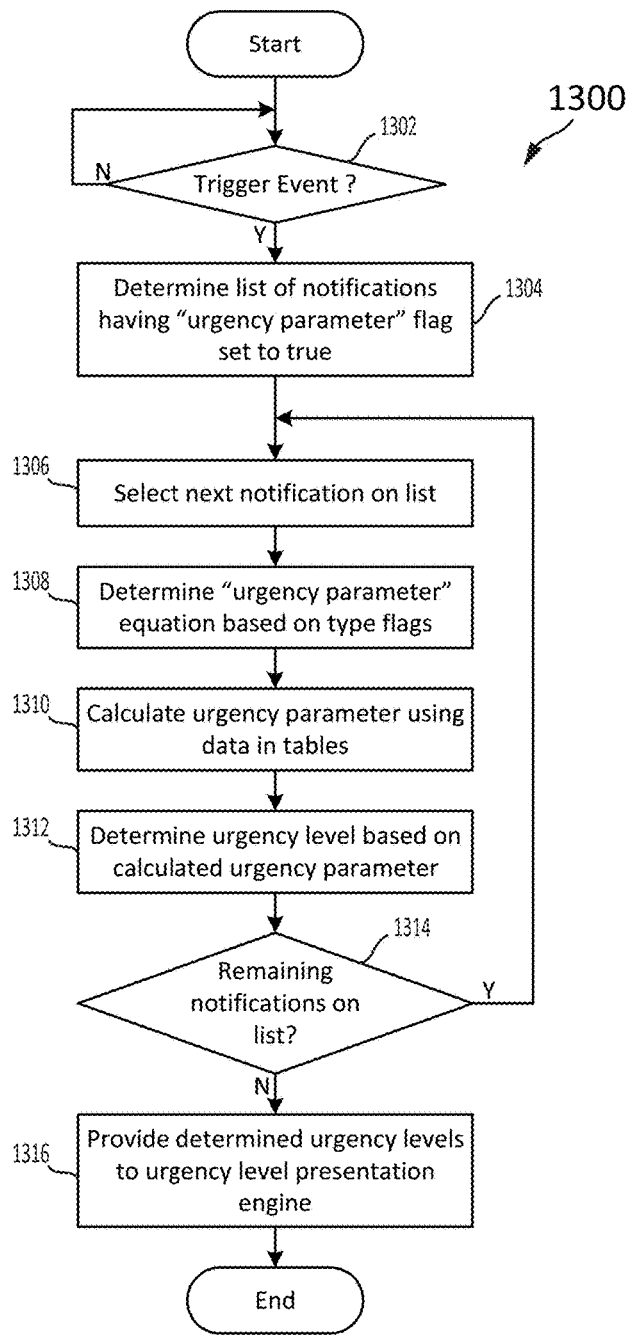
FIG. 13 is flowchart showing an example routine that may be performed by urgency level determination engine shown in FIG. 6.

The urgency level determination engine 612 may be responsible for calculating appropriate urgency parameters for respective notifications 106, 546 based of the notification "type" information determined by the urgency factor determination engine 608, e.g., as indicated by various flags in the "notification parameter" table 800, as well as the entries in the "broadcast task completion" table 900, the "association task completion" table 1000, and/or the "task pendency" table 1100, as appropriate. As explained in more detail below, in some implementations, the urgency level determination engine 612 may identify a group of notifications for which urgency parameters are to be calculated/updated based on the states of the "urgency parameter" flags in the "notification parameter" table 800, and may select appropriate equations to use to calculate the urgency parameters for such notifications based on the states of the "broadcast" flags, the "association" flags, and the "deadline" flags in that same table 800. FIG. 13, which is described in more detail below, shows an example routine 1300 that may be performed by the urgency factor determination engine 608. Example equations that may be used to calculate urgency parameters based on the states of the "broadcast" flag, the "association" flag, and the "deadline" flag for respective notifications 106, 546 are also described below in connection a step 1308 of the routine 1300 (shown in FIG. 13).

Figure 14:
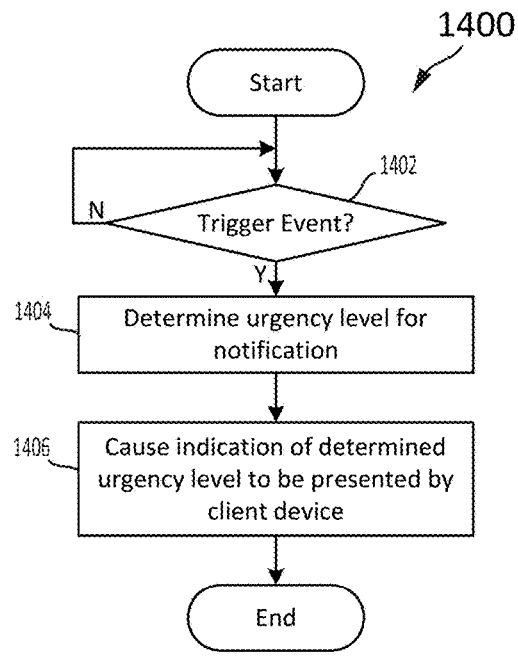
FIG. 14 is flowchart showing an example routine that may be performed by urgency level presentation engine shown in FIG. 6.

The urgency level presentation engine 614 may be responsible for causing indications of determined urgency levels for respective notifications 106, 546 to be presented on the client device(s) 202 to which such notifications 106, 546 are sent. FIG. 14, which is described in more detail below, shows an example routine 1400 that may be performed by the urgency level presentation engine 614.

As noted previously, FIG. 7 shows an example routine 700 that may be performed by the urgency factor determination engine 608 in accordance with some embodiments. In some implementations, the urgency factor determination engine 608 may be included within, or operate in conjunction with, the analytics service 536 shown in FIG. 5C. As discussed above in connection with FIG. 5C, in some implementations, the analytics service 536 may be the entity that is responsible for creating notifications 546 (e.g., targeted scored notifications) and sending such notifications 546 to the notification service 538 for further processing.

As shown in FIG. 7, the routine 700 may begin at a decision step 702, at which the urgency factor determination engine 608 may determine whether a new notification 106, 546 has been generated (e.g., by the analytics service 536).

When, at the decision step 702, the urgency factor determination engine 608 determines that a new notification 106, 546 has been generated, the routine 700 may proceed to a step 704, at which the urgency factor determination engine 608 may create a new set of entries for the new notification 106, 546 in the "notification parameter" table 800 shown in FIG. 8. For example, the top row entries in the table 800 may have been created in the table 800 when "Notification A" was generated. As shown, in addition to "notification ID" entries 802, which may uniquely identify the respective notifications 106, 546 in the table 800, the table 800 may include (A) "task ID" entries 804, which may identify the particular tasks that are indicated by the notifications 106, 546, (B) "broadcast flag" entries 806, which may indicate whether the notification 106, 546 has been categorized as a "broadcast" type (described below), (C) "association flag" entries 808, which may indicate whether the notification 106, 546 has been categorized as an "association" type (described below), (D) "deadline flag" entries 810, which may indicate whether the notification 106, 546 has been categorized as a "deadline" type (described below), (E) "urgency parameter flag" entries 812, which may indicate whether the notifications are of a type for which an urgency parameter may be calculated, (F) "urgency parameter" entries 814, which may indicate the current values of calculated urgency parameters for the respective notifications 106, 546, and (G) "urgency level" entries 816, which may indicate the urgency levels (e.g., "standard," "low," "medium," or "high") that have been assigned to the respective notifications 106, 546 based on the current values of the "urgency parameter" entries 814. When entries are first created in the table 800 for a new notification 106, 546, the values of the various "flag" entries 806, 808, 810, 812 may be initialized to "false," the value of the "urgency parameter" entry 814 may be initialized to "0," and the value of the "urgency level" entry 816 may be initialized to "standard."

At a decision step 706, the urgency factor determination engine 608 may determine whether the new notification 106, 546 is one of several instances of the same notification 106, 546 that was broadcasted to respective users, and should thus be categorized as a "broadcast" type of notification. Such a determination may be made, for example, by comparing the content of the new notification 106, 546 with that of other notifications 546 that were generated at or about the same time as the new notification (e.g., within a predetermined window of time surrounding the time the new notification was generated), and determining whether one or more of those other notifications are within a threshold degree of similarity of the new notification.

When, at the decision step 706, the urgency factor determination engine 608 determines that the new notification 106, 546 is a "broadcast" type of notification, the routine 700 may proceed to a step 708, at which the urgency factor determination engine 608 may create entries for the task indicated by the broadcasted notification in the "broadcast task completion" table 900 shown in FIG. 9. As shown in FIG. 9, sets of tasks indicated by the notifications 106, 546 that are determined to have been broadcasted to multiple recipients may be linked together in the table 900 by entering the same value (e.g., "group 1") in the respective "broadcast group ID" entries 902 that are associated with "task ID" entries 904 for those tasks. As shown, "user ID" entries 906 may additionally be populated in the "broadcast task completion" table 900 to identify the users to whom the indicated tasks have been assigned, e.g., to facilitate monitoring of user activity by the task activity monitoring engine 610 (described below). The value of the "complete?" entries 908 in the "broadcast task completion" table 900, which may indicate whether the corresponding task indicated by the "task ID" entry 904 has been completed by the user indicated by the "user ID" entry 906, may be initialized to "no" when the entries 902, 904, 906, 908 are first created, to indicate that none of the identified users have yet completed the indicated tasks.

At a step 710 of the routine 700, the urgency factor determination engine 608 may set the value of the "broadcast flag" entry 806 in the "notification parameter" table 800 (shown in FIG. 8) to "true" to indicate that the urgency factor determination engine 608 has categorized the new notification 106, 546 as a "broadcast" type of notification.

At a decision step 712, the urgency factor determination engine 608 may determine whether there exist any other, different tasks that are associated with the task indicated by the new notification 106, 546, such as by being part of the same common project, so that the new task should be categorized as an "association" type of notification. Such a determination may be made, for example, by querying the system of record 526 responsible for generating the task indicated by the new notification 106, 546, to identify any associated tasks. As one example, a JIRA application may be queried to identify other issues in the same epic as the task indicated by the new notification. In some implementations, the urgency factor determination engine 608 may query the pertinent system of record 526 using a data "syncing" process similar to that used by the microapp service 528, as described above connection with FIG. 5C. In particular, the urgency factor determination engine 608 may retrieve encrypted service account credentials for the pertinent system of record 526 from the credential wallet service 532 and request a sync with the data integration provider service 530. The data integration provider service 530 may then decrypt the service account credentials and use those credentials to retrieve data from the system of record 526. The data integration provider service 530 may then stream the retrieved data to the urgency factor determination engine 608.

When, at the decision step 712, the urgency factor determination engine 608 identifies other, different tasks that are associated with the task indicated by the new notification 106, 546, the routine 700 may proceed to a step 714, at which the urgency factor determination engine 608 may create entries in the "association task completion" table 1000 shown in FIG. 10. As shown in FIG. 10, a set of tasks that are determined to be associated with the task indicated by the new notification 106, 546 may be linked together in the table 1000 by entering the same value (e.g., "group 3") in the respective "association group ID" entries 1002 that are associated with "task ID" entries 1004 for those tasks. As shown, "user ID" entries 1006 may additionally be populated in the "association task completion" table 1000 to identify the users to whom the indicated tasks have been assigned, e.g., to facilitate monitoring of user activity by the task activity monitoring engine 610 (described below). The value of the "complete?" entries 1008 in the "association task completion" table 1000, which may indicate whether the corresponding task indicated by the "task ID" entry 1004 has been completed by the user indicated by the "user ID" entry 1006, may be initialized to "no" when the entries 1002, 1004, 1006, 1008 are first created, to indicate that none of the identified users have yet completed the indicated tasks.

At a step 716 of the routine 700, the urgency factor determination engine 608 may set the value of the "association flag" entry 808 in the "notification parameter" table 800 (shown in FIG. 8) to "true" to indicate that the urgency factor determination engine 608 has categorized the new notification 106, 546 as an "association" type of notification.

At a decision step 718, the urgency factor determination engine 608 may determine whether the new notification 106, 546 specifies a deadline by which the task indicated by the new notification 106, 546 is to be completed, so that the new task should be categorized as a "deadline" type of notification. Such a determination may be made, for example, by examining the content of new notification for information indicative of a deadline. For example, the content may be examined to determine whether it includes key words or phrases, together with date and/or time information, that specify a date and/or time for completion of the indicated task.

When, at the decision step 718, the urgency factor determination engine 608 determines that the new notification 106, 546 indicates a completion deadline, the routine 700 may proceed to a step 720, at which the urgency factor determination engine 608 may create entries in the "task pendency" table 1100 shown in FIG. 11. As shown in FIG. 11, the "task pendency" table 1100 may be populated to include, in association with respective "notification ID" entries 1102 (which identify individual notifications 106, 546), "initiation time" entries 1104 (which identify times and/or dates on which the respective notifications 106, 546 were initiated), and "deadline" entries 1106 indicating the completion deadlines the urgency factor determination engine 608 determined were specified in the notifications 106, 546.

At a step 720 of the routine 700, the urgency factor determination engine 608 may set the value of the "deadline flag" entry 810 in the "notification parameter" table 800 (shown in FIG. 8) to "true" to indicate that the urgency factor determination engine 608 has categorized the new notification 106, 546 as a "deadline" type of notification.

At a decision step 724, the urgency factor determination engine 608 may determine whether the any of the flags 806, 808, 810 in the "notification parameter" table 800 have been set to "true." When, at the decision step 724, the urgency factor determination engine 608 determines that at least one of the flags 806, 808, 810 has been set to "true," the routine may proceed to a step 726, at which the urgency factor determination engine 608 may set the "urgency parameter" flag 812 in the "notification parameter" table 800 (shown in FIG. 8) to "true." When, on the other hand, the urgency factor determination engine 608 determines (at the decision step 724) that none the flags 806, 808, 810 has been set to "true," the routine 700 may terminate, thus leaving the "urgency parameter" flag 812 in the "notification parameter" table 800 (shown in FIG. 8) set to "false."

FIG. 12 shows an example routine 1200 that may be performed by the task activity monitoring engine 610 shown in FIG. 6 in accordance with some embodiments of the presents disclosure. As noted previously, the role of the task activity monitoring engine 610 is to monitor activity within the notification urgency determination system 102 and/or on the client device(s) 202 to detect when the tasks indicated in the "broadcast task completion" table 900 and the "association task completion" table 1000 have been completed. In some implementations, the task activity monitoring engine 610 may include one or more components included among the resource management service(s) 502 described above in connection with FIG. 5A-C, such as one or more components that are included within, or that operate in conjunction with, the analytics service 536 shown in FIG. 5C, one or more components that are included within, or that operate in conjunction with, the gateway service 506 shown in FIG. 5B, and/or one or more components that are included within, or that operate in conjunction with, the client interface service 514 shown in FIGS. 5B and 5C. In some implementations, the task activity monitoring engine 610 may additionally or alternatively include one or more components that are included within, or that operate in conjunction with, one or more client devices 202, such as one or more plugins or other enhancements to the resource access application 522 shown in FIGS. 5B and 5C.

The task activity monitoring engine 610 may determine that tasks indicated in the tables 900, 1000 have been completed in any of numerous ways and based on information from any of a number of sources. In some implementations, for example, user interactions with microapps corresponding to notifications 546 for the tasks may be monitored to determine when users initiate actions via such microapps to complete such tasks. In other implementations, data retrieved from systems of record 526, e.g., via a data sync operation as discussed above, may additionally or alternatively be evaluated to determine when certain tasks have been completed. For example, data retrieved from a JIRA application may indicate whether issues in an epic are "done," "cancelled," "need info," etc. Retrieval of JIRA data indicating that an issue is "done" or "cancelled" may, for example, indicate that the task corresponding to such an issue is "complete," and the task activity monitoring engine 610 may update the "association task completion" table 1000 to reflect the same. In yet other implementations, user interactions with one or more resource feeds 504 via a gateway service 506 (as shown in FIGS. 5A and B) may additionally or alternatively be monitored, e.g., by using one or more components within the gateway service 506, to determine when users take actions to complete the indicated tasks. In still other implementations, user interactions with one or more SaaS applications 508 (as shown in FIGS. 5A and B) may additionally or alternatively be monitored, e.g., by using a plugin or other enhancement to a browser that a client device 202 uses to access the SaaS application 508, to determine when users take actions to complete the indicated tasks. For example, if a task indicated in one of the tables 900, 1000 involves completing a survey by clicking on a link for a SaaS application 508, a component of the task activity monitoring engine 610 on the client device 202 may determine whether a user 524 has clicked on the indicated link.

As shown in FIG. 12, wherever and however it is implemented, the routine 1200 may include decision steps 1202 and 1204, at which the task activity monitoring engine 610 may determine whether any tasks indicated in the "broadcast task completion" table 900 and the "association task completion" table 1000, respectively, have been completed.

When, at the decision step 1202, the task activity monitoring engine 610 determines that a task indicated in the "broadcast task completion" table 900 has been completed, the routine 1200 may proceed to a step 1206, at which the task activity monitoring engine 610 may update the "complete?" entry 908 for that task to indicate that the task has been completed, e.g., by changing the value of the entry 908 to "yes."

At a step 1208, the task activity monitoring engine 610 may set the "urgency parameter" flag 812 for the notification 546 corresponding to the completed task to "false." As discussed below in connection with a step 1304 of the routine 1300 (shown in FIG. 13), setting the "urgency parameter" flag 812 for a notification to "false" may exclude that notification from the group of notifications for which the urgency level determination engine 612 needs to calculate an urgency parameter, thus reducing the computational load of the system.

When, at the decision step 1204, the task activity monitoring engine 610 determines that a task indicated in the "association task completion" table 1000 has been completed, the routine 1200 may proceed to a step 1210, at which the task activity monitoring engine 610 may update the "complete?" entry 1008 for that task to indicate that the task has been completed, e.g., by changing the value of the entry 1008 to "yes."

Like the step 1208, at a step 1212, the task activity monitoring engine 610 may set the "urgency parameter" flag 812 for the notification 546 corresponding to the completed task to "false," thus excluding that notification from the group of notifications for which the urgency level determination engine 612 needs to calculate an urgency parameter in connection with the routine 1300.

FIG. 13 shows an example routine 1300 that may be performed by the urgency level determination engine 612 shown in FIG. 6 in accordance with some embodiments of the present disclosure. Pursuant to the routine 1300, the urgency level determination engine 612 may calculate (or recalculate) the values of the "urgency parameter" entries 814 in the "notification parameter" table 800 for respective notifications 546, as well as to adjust the values of the corresponding "urgency level" entries 816 for those notifications 546, as needed, in accordance with any new values of the "urgency parameter" entries 814.

As shown in FIG. 13, the routine 1300 may begin in response to the urgency level determination engine 612 detecting, at a decision step 1302, a trigger event. The detected trigger event may take on any of numerous forms and may be detected in any of a number of ways. In some implementations, the urgency level determination engine 612 may detect only a single type of trigger event, e.g., a periodic signal. In other implementations, the urgency level determination engine 612 may detect multiple different types of trigger events. In some circumstances, the trigger event detected at the step 1302 may be a state change of a periodic signal based on a clock, a timer, or the like. Such a signal may, for example, cause the routine 1300 to be executed (at least) at midnight each day, every four hours, etc. In other circumstances, the step 1302 may instead involve a determination of whether a predetermined time period has elapsed since the last time the routine 1300 was executed, thus ensuring that the values of the "urgency level" entries 816 do not become stale for longer than that predetermined time period. In still other circumstances, the step 1302 may involve a determination of whether one or more "complete?" entries 908, 1008 in the tables 900, 1000 have been updated and/or that other information that might impact the values of the "urgency parameter" entries 814 and/or the "urgency level" entries 816 in the "notification parameter" table 800 has been received or has changed.

When, at the decision step 1302, such a trigger event is detected, the routine 1300 may proceed to a step 1304, at which the urgency level determination engine 612 may identify those notifications 546 represented in the "notification parameter" table 800 for which the "urgency parameter flag" entry 812 has been set to "true." As indicated, in some implementations, the urgency level determination engine 612 may create a list of such notifications 106, 546 for further processing by subsequent steps 1306, 1308, 1310, and 1312. In particular, at the step 1306, the next notification on the list may be selected, and, pursuant to a decision step 1314, the routine 1300 may cycle through the respective notifications on the list to (A) determine (at the step 1308) an appropriate equation to use to calculate a value of the "urgency parameter" entry 814 for that notification, (B) use the determined equation to calculate (at the step 1310) the value of that "urgency parameter" entry 814, and (C) determine (at the step 1312) a value of the "urgency level" entry 816 based on the determined value of the "urgency parameter" entry 814. In some implementations, the steps 1308, 1310, 1312 may instead be performed, in whole or in part, in parallel for the respective notifications 546 on the list, rather than processing the notifications 546 one at a time, as indicated in FIG. 13.

As shown in FIG. 13, at the step 1308, the urgency level determination engine 612 may determine, based the states of the notification "type" flags indicated in the "notification parameter" table 800, an appropriate equation to use to calculate a value of the "urgency parameter" entry 814 for the notification 546 selected at the step 1306. As discussed above, in some implementations, the "type" flags for a given notification 546 may include a "broadcast flag" entry 806, an "association flag" entry 808, and a "deadline flag" entry 810. As one example, in some implementations, the urgency level determination engine 612 may select one the seven different equations (described below) based on the "type" flags as indicated in Table 1 below:

TABLE 1

| Broadcast Flag | Association Flag | Deadline Flag | Urgency Parameter Equation |
|---|---|---|---|
| True | False | False | Equation 1 |
| False | True | False | Equation 2 |
| False | False | True | Equation 3 |
| True | True | False | Equation 4 |

TABLE 1-continued

| Broadcast Flag | Association Flag | Deadline Flag | Urgency Parameter Equation |
|---|---|---|---|
| False | True | True | Equation 5 |
| True | False | True | Equation 6 |
| True | True | True | Equation 7 |

In some implementations, Equations 1 through 7 may be defined as shown below. The respective variables in such equations, as well as example techniques for determining such variables, are also described below, following each equation.

$$P = \frac{Cb}{Tb} \qquad \text{Equation 1}$$

Equation 1 may be used to calculate a value of the "urgency parameter" entry 814 for a notification 546 that has been categorized as only a "broadcast" type of notification. As described above, for copies of the same notification that are broadcasted together, the tasks indicated by such notifications may be assigned a common "broadcast group ID" value in the "broadcast completion" table 900. The variable Tb in Equation 1 may represent the total number of tasks that are included within the same broadcast group as the task indicated by the notification being evaluated, and the variable Cb in Equation 1 may represent the number of those commonly-grouped tasks that have been completed (e.g., as indicated by "yes" values for the "complete?" entries 908).

$$P = \frac{Ca}{Ta} \qquad \text{Equation 2}$$

Equation 2 may be used to calculate a value of the "urgency parameter" entry 814 for a notification 546 that has been categorized as only an "association" type of notification. As described above, in some implementations, different tasks that are related to one another in some fashion, such as being a part of the same project, may be identified (e.g., by querying a system of record 526) and information indicating whether such related tasks have been completed may be stored in the "associate task completion" table 1000. Further, as was explained in connection with FIG. 8, in some implementations, such related tasks may be assigned a common "association group ID" value in the "association completion" table 1000. The variable Ta in Equation 2 may represent the total number of tasks that are included within the same association group as the task indicated by the notification being evaluated, and the variable Ca in Equation 2 may represent the number of those commonly-grouped tasks that have been completed (e.g., as indicated by "yes" values for the "complete?" entries 1008).

$$P = \frac{Tc - Ti}{Td - Ti} \qquad \text{Equation 3}$$

Equation 3 may be used to calculate a value of the "urgency parameter" entry 814 for a notification 546 that has been categorized as only an "deadline" type of notification. The variable Tc in Equation 3 may represent the current time, i.e., the time at which the urgency parameter is currently being calculated for the notification 546 being evaluated. As noted above, in some implementations, for purposes of calculating urgency parameter values, time may be measured in units of days. The variable Ti in Equation 3 may represent the time at which the notification 546 being evaluated was initiated, e.g., when it was first created by the analytics service 536 (shown in FIG. 5C) or when it was first pushed to a client device 202 via the notification service 538 (also shown in FIG. 5C). The variable Td in Equation 3 may represent the deadline that the urgency factor determine engine 608 determined was specified in the notification being evaluated. The values of the variables Ti and Td may be determined, for example, by referencing values of the "initiation time" entry 1104 and the "deadline" entry 1106 in the "task pendency" table 1100 (shown in FIG. 11) for the notification 106, 546 being evaluated $$P = W1 * \frac{Cb}{Tb} + W2 * \frac{Ca}{Ta}$$ Equation 4

Equation 4 may be used to calculate a value of the "urgency parameter" entry 814 for a notification 546 that has been categorized as both a "broadcast" type and an "association" type of notification. The variables Ca, Cb, Ta, and Tb in Equation 4 may be the same as the variables in Equations 1 and 2. W1 and W2 in Equation 4 are weighting values that may be applied to respective portions of the equation. The weighing values may be set, e.g., by a developer or a system administrator, to control the degree by which a particular equation portion will influence the urgency parameter being calculated. In some implementations, the weighting values W1 and W2 may be set to that their sum is equal to "1," thus ensuring the value of the calculated urgency parameter falls in the range between "0" and "1."

$$P = W3 * \frac{Ca}{Ta} + W4 * \frac{Tc - Ti}{Td - Ti}$$ Equation 5

Equation 5 may be used to calculate a value of the "urgency parameter" entry 814 for a notification 546 that has been categorized as both an "association" type and a "deadline" type of notification. The variables Ca, Ta, Tc, Ti, and Td in Equation 5 may be the same as the variables in Equations 2 and 3. W3 and W4 in Equation 5 are weighting values that may be applied to respective portions of the equation. The weighing values may be set, e.g., by a developer or a system administrator, to control the degree by which a particular equation portion will influence the urgency parameter being calculated. In some implementations, the weighting values W3 and W4 may be set to that their sum is equal to "1," thus ensuring the value of the calculated urgency parameter falls in the range between "0" and "1."

$$P = W5 * \frac{Cb}{Tb} + W6 * \frac{Tc - Ti}{Td - Ti}$$ Equation 6

Equation 6 may be used to calculate a value of the "urgency parameter" entry 814 for a notification 546 that has been categorized as both a "broadcast" type and a "deadline" type of notification. The variables Cb, Tb, Tc, Ti, and Td in Equation 6 may be the same as the variables in Equations 1 and 3. W5 and W6 in Equation 6 are weighting values that may be applied to respective portions of the equation. The weighing values may be set, e.g., by a developer or a system administrator, to control the degree by which a particular equation portion will influence the urgency parameter being calculated. In some implementations, the weighting values W5 and W6 may be set to that their sum is equal to "1," thus ensuring the value of the calculated urgency parameter falls in the range between "0" and "1."

$$P7 = W7 * \frac{Cb}{Tb} + W8 * \frac{Ca}{Ta} + W9 * \frac{Tc - Ti}{Td - Ti}$$ Equation 7

Equation 7 may be used to calculate a value of the "urgency parameter" entry 814 for a notification 546 that has been categorized as each of a "broadcast" type, an "association" type, and a "deadline" type of notification. The variables Ca, Cb, Ta, Tb, Tc, Ti, and Td in Equation 7 may be the same as the variables in Equations 1 through 3. W7, W8 and W9 in Equation 7 are weighting values that may be applied to respective portions of the equation. The weighing values may be set, e.g., by a developer or a system administrator, to control the degree by which a particular equation portion will influence the urgency parameter being calculated. In some implementations, the weighting values W7, W8 and W9 may be set to that their sum is equal to "1," thus ensuring the value of the calculated urgency parameter falls in the range between "0" and "1."

At the step 1310, the urgency level determination engine 612 may use the equation determined at the step 1308 to calculate an urgency parameter for the notification being evaluated. As discussed above, data in the "broadcast task completion" table 900, the "association task completion" table 1000, and/or the "task pendency" table 1100 may be used to determine values of the variables in the selected equation. In some implementations, the various equations are formulated so as to yield a parameter in the range between "0" (or zero percent) and "1" (or one hundred percent).

At a step 1312, the urgency level determination engine 612 may use the urgency level parameter calculated at the step 1310 to determine an urgency level for the notification being evaluated. In some implementations, the urgency level determination engine 612 may make such a determination by referencing a lookup table such as Table 2 shown below.

TABLE 2

| Urgency Parameter Range | Urgency Level |
| --- | --- |
| 0-30% | Standard |
| 31%-60% | Low |
| 61%-90% | Medium |
| 91%-100% | High |

At a step 1316 of the routine 1300, the urgency level determination engine 612 may provide data indicating the urgency levels determined at the step 1312 to the urgency level presentation engine 614 (shown in FIG. 6). As noted above, the urgency level presentation engine 614 may be responsible for causing indications of determined urgency levels for respective notifications 106, 546 to be presented on the client device(s) 202 to which such notifications 106, 546 are sent.

FIG. 14 shows an example routine 1400 that may be performed by urgency level presentation engine 614 shown in FIG. 6. As shown, the routine 1400 may begin at a decision step 1402, at which the urgency level presentation engine 614 may determine whether a trigger event to initiate the remainder of the routine 1400 has been detected. As shown, upon detection of such a trigger event, the routine 1400 may proceed to a step 1404, at which the urgency level for one or more notifications 106, 546 may be determined, e.g., based on the data received from the urgency level determination engine 612, and then to a step 1406, at which the urgency level presentation engine 614 may cause indication(s) of the determined urgency level(s) to be presented on the client device 202.

The urgency level presentation engine 614 may take on any of numerous forms and may be disposed at any of a number of locations within the system. In some implementations, the urgency level presentation engine 614 may be embodied, in whole or in part, within a client device 202, e.g., as a component of the resource access application 522 (shown in FIGS. 5B and 5C). In such implementations, the client device 202 may be at least partially responsible for presenting indications of determined urgency levels for notifications 106, 546 to a user 524. For example, in some circumstances, the trigger event detected at the decision step 1402 may correspond to user interacting with the user interface element 570 (shown in FIG. 5D) to select "urgency" as a sorting option, or selecting a filter option, e.g., via a user interface element 568, so as to view notifications that have been assigned one or more particular urgency levels, e.g., to view only "high" urgency notifications. Selecting an "urgency" sorting option may, for example, cause the notifications 546 having the highest urgency parameters (calculated as discussed above) to appear closer to the top of the activity feed 544. In other circumstances, a positive determination at the decision step 1402 may simply represent a determination by the client device 202 that a notification is to be presented on a display screen of the client device. For example, in some implementations, the client device 202 may perform the step 1406 each time a new notification is displayed, such as by causing a border or other portion of the displayed notification 546 to be highlighted or color coded to represent the urgency level determined by the urgency level determination engine 612. Other examples of steps that the client device 202 may take to indicate the determined urgency levels are described above in Section A.

In some implementations, the urgency level presentation engine 614 may additionally or alternatively be embodied, in whole or in part, by a system component other than the client device 202. For example, in some implementations, the urgency level presentation engine 614 may be included, in whole or in part, among the resource management service(s) shown in FIGS. 5A-C. For example, in some circumstances, a positive determination at the decision step 1402 may represent a determination by the notification service 538 that a notification is to be pushed to the client device 202. In such a circumstance, the notification service 538 may, for example, perform the step 1406 by color coding or otherwise modifying notifications 106, 546 to indicate the urgency levels that were determined by the urgency level determination engine 612. In other circumstances, a positive determination at the decision step 1402 may represent a determination by the notification service 538 that a client device 202 has requested that notifications 546 be filtered and/or or sorted in a particular way. In still other implementations, a positive determination at the decision step 1402 may represent a determination by the notification service 538, the analytics service 536, or some other server-based component that a new urgency level has been assigned to a notification. For example, in some circumstances, the notification service 538 may receive data from the urgency level determination engine 612 indicating that a particular notification has been assigned a "high" urgency level. Based on such a new urgency level designation, the notification service 538 may perform the step 1406 by re-pushing the notification 546, possibly modified or enhanced to reflect the "high" urgency status, to the client device 202. The notification service 538 may, for example, determine to re-push the notification to the client device 202 based on the notification service 538 also determining that the notification at issue has been dismissed from the activity feed 544 presented on a client device 202, e.g., in response to a user 524 clicking on a "close" user interface element 550.

G. Example Implementations of Methods, Systems, and Computer-Readable Media in Accordance with the Present Disclosure The following paragraphs (M1) through (M13) describe examples of methods that may be implemented in accordance with the present disclosure.

(M1) A method may involve sending, by a computing system, a first notification to a first client device, the first notification indicating a first task to be performed by a first user with respect to a resource accessible to the computing system; identifying, by the computing system, a second task of a second user with respect to the resource; determining that the second user has completed the second task; determining, by the computing system, a parameter indicating an urgency level of the first task, the parameter being based at least in part on the second user having completed the second task; and causing, by the computing system, an indication of the urgency level to be presented on the first client device.

(M2) A method may be performed as described in paragraph (M1), wherein the first notification may further include at least one user interface element corresponding to a first action to be taken with respect to the first task.

(M3) A method may be performed as described in paragraph (M1) or paragraph (M2), and may further involve sending a second notification to a second client device, the second notification indicating the second task; and identifying the second task at least in part by determining that at least one feature of the second notification is identical to at least one feature of the first notification.

(M4) A method may be performed as described in any of paragraphs (M1) through (M3), and may further involve receiving information from the resource indicating that the second task is associated with the first task; and identifying the second task based at least in part on the received information.

(M5) A method may be performed as described in any of paragraphs (M1) through (M4), and may further involve determining a total number of tasks, including the first task and the second task, that the resource has indicated are associated; and determining a quantity of the total number of tasks have been completed; wherein determining the parameter may be further based at least in part on the total number of tasks and the quantity.

(M6) A method may be performed as described in any of paragraphs (M1) through (M5), and may further involve determining a total number of tasks, including the first task and the second task, that were indicated in a message broadcasted to multiple individuals; and determining a quantity of the total number of tasks that have been completed;

wherein determining the parameter may be further based at least in part on the total number of tasks and the quantity.

(M7) A method may be performed as described in any of paragraphs (M1) through (M6), and may further involve sending, by the computing system, a request to the resource to identify one or more other tasks that are associated with the first task.

(M8) A method may be performed as described in any of paragraphs (M1) through (M7), and may further involve determining an initiation time of the first notification; and determining a deadline for completing the first task; wherein determining the parameter may be further based at least in part on the initiation time, the deadline, and a current time.

(M9) A method may be performed as described in any of paragraphs (M1) through (M8), wherein causing the indication to be presented may further comprise altering at least one feature of the first notification presented on a display screen of the first client device to indicate the urgency level.

(M10) A method may be performed as described in any of paragraphs (M1) through (M9), wherein causing the indication to be presented may further comprise altering a manner in which the first notification is presented on a display screen of the first client device to indicate the urgency level.

(M11) A method may involve sending, by a computing system, a notification to a client device, the notification indicating a first task to be performed with respect to a resource accessible to the client device; determining an initiation time of the notification; determining a deadline for completing the first task; determining a parameter indicating an urgency level of the first task, the parameter being based at least in part on the initiation time, the deadline, and a current time; and causing an indication of the urgency level to be presented on the client device.

(M12) A method may be performed as described in paragraph (M11), wherein causing the indication to be presented may further comprise altering at least one feature of the notification presented on a display screen of the client device to indicate the urgency level.

(M13) A method may be performed as described in paragraph (M11) or paragraph (M12), wherein causing the indication to be presented may further comprise altering a manner in which the notification is presented on a display screen of the client device to indicate the urgency level.

The following paragraphs (S1) through (S13) describe examples of systems and/or devices that may be implemented in accordance with the present disclosure.

(S1) A system may comprise at least one processor, and at least one computer-readable medium encoded with instructions which, when executed by the at least one processor, cause the computing system to send a first notification to a first client device, the first notification indicating a first task to be performed by a first user with respect to a resource accessible to the computing system, to identify a second task of a second user with respect to the resource, to determine that the second user has completed the second task, to determine a parameter indicating an urgency level of the first task, the parameter being based at least in part on the second user having completed the second task, and to cause an indication of the urgency level to be presented on the first client device.

(S2) A system may be configured as described in paragraph (S1), and the at least one computer-readable medium may be further encoded with additional instructions which, when executed by the at least one processor, further cause the computing system to cause the first notification to further include at least one user interface element corresponding to a first action to be taken with respect to the first task.

(S3) A system may be configured as described in paragraph (S1) or paragraph (S2), and the at least one computer-readable medium may be further encoded with additional instructions which, when executed by the at least one processor, further cause the computing system to send a second notification to a second client device, the second notification indicating the second task, and to identify the second task at least in part by determining that at least one feature of the second notification is identical to at least one feature of the first notification (S4) A system may be configured as described in any of paragraphs (S1) through (S3), and the at least one computer-readable medium may be further encoded with additional instructions which, when executed by the at least one processor, further cause the computing system to receive information from the resource indicating that the second task is associated with the first task, and to identify the second task based at least in part on the received information.

(S5) A system may be configured as described in any of paragraphs (S1) through (S4), and the at least one computer-readable medium may be further encoded with additional instructions which, when executed by the at least one processor, further cause the computing system to determine a total number of tasks, including the first task and the second task, that the resource has indicated are associated, to determine a quantity of the total number of tasks have been completed, and to determine the parameter further based at least in part on the total number of tasks and the quantity.

(S6) A system may be configured as described in any of paragraphs (S1) through (S5), and the at least one computer-readable medium may be further encoded with additional instructions which, when executed by the at least one processor, further cause the computing system to determine a total number of tasks, including the first task and the second task, that were indicated in a message broadcasted to multiple individuals, to determine a quantity of the total number of tasks that have been completed, and to determine the parameter further based at least in part on the total number of tasks and the quantity.

(S7) A system may be configured as described in any of paragraphs (S1) through (S6), and the at least one computer-readable medium may be further encoded with additional instructions which, when executed by the at least one processor, further cause the computing system to send a request to the resource to identify one or more other tasks that are associated with the first task.

(S8) A system may be configured as described in any of paragraphs (S1) through (S7), and the at least one computer-readable medium may be further encoded with additional instructions which, when executed by the at least one processor, further cause the computing system to determine an initiation time of the first notification, to determine a deadline for completing the first task, and to determine the parameter further based at least in part on the initiation time, the deadline, and a current time.

(S9) A system may be configured as described in any of paragraphs (S1) through (S8), and the at least one computer-readable medium may be further encoded with additional instructions which, when executed by the at least one processor, further cause the computing system to cause the indication to be presented at least in part by altering at least one feature of the first notification presented on a display screen of the first client device to indicate the urgency level.

(S10) A system may be configured as described in any of paragraphs (S1) through (S9), and the at least one computer-readable medium may be further encoded with additional instructions which, when executed by the at least one processor, further cause the computing system to cause the indication to be presented at least in part by altering a manner in which the first notification is presented on a display screen of the first client device to indicate the urgency level.

(S11) A system may comprise at least one processor, and at least one computer-readable medium encoded with instructions which, when executed by the at least one processor, cause the computing system to send a notification to a client device, the notification indicating a first task to be performed with respect to a resource accessible to the client device, to determine an initiation time of the notification, to determine a deadline for completing the first task, to determine a parameter indicating an urgency level of the first task, the parameter being based at least in part on the initiation time, the deadline, and a current time, and to cause an indication of the urgency level to be presented on the client device.

(S12) A system may be configured as described in paragraph (S11), and the at least one computer-readable medium may be further encoded with additional instructions which, when executed by the at least one processor, further cause the computing system to cause the indication to be presented at least in part by altering at least one feature of the notification presented on a display screen of the client device to indicate the urgency level.

(S13) A system may be configured as described in paragraph (S11) or paragraph (S12), and the at least one computer-readable medium may be further encoded with additional instructions which, when executed by the at least one processor, further cause the computing system to cause the indication to be presented at least in part by altering a manner in which the notification is presented on a display screen of the client device to indicate the urgency level.

The following paragraphs (CRM1) through (CRM13) describe examples of computer-readable media that may be implemented in accordance with the present disclosure.

(CRM1) At least one non-transitory, computer-readable medium may be encoded with instructions which, when executed by at least one processor included in a computing system, cause the computing system to send a first notification to a first client device, the first notification indicating a first task to be performed by a first user with respect to a resource accessible to the computing system, to identify a second task of a second user with respect to the resource, to determine that the second user has completed the second task, to determine a parameter indicating an urgency level of the first task, the parameter being based at least in part on the second user having completed the second task, and to cause an indication of the urgency level to be presented on the first client device.

(CRM2) At least one computer-readable medium may be configured as described in paragraph (CRM1), and the at least one computer-readable medium may be further encoded with additional instructions which, when executed by the at least one processor, further cause the computing system to cause the first notification to further include at least one user interface element corresponding to a first action to be taken with respect to the first task.

(CRM3) At least one computer-readable medium may be configured as described in paragraph (CRM1) or paragraph (CRM2), and may be further encoded with additional instructions which, when executed by the at least one processor, further cause the computing system to send a second notification to a second client device, the second notification indicating the second task, and to identify the second task at least in part by determining that at least one feature of the second notification is identical to at least one feature of the first notification (CRM4) At least one computer-readable medium may be configured as described in any of paragraphs (CRM1) through (CRM3), and may be further encoded with additional instructions which, when executed by the at least one processor, further cause the computing system to receive information from the resource indicating that the second task is associated with the first task, and to identify the second task based at least in part on the received information.

(CRM5) At least one computer-readable medium may be configured as described in any of paragraphs (CRM1) through (CRM4), and may be further encoded with additional instructions which, when executed by the at least one processor, further cause the computing system to determine a total number of tasks, including the first task and the second task, that the resource has indicated are associated, to determine a quantity of the total number of tasks have been completed, and to determine the parameter further based at least in part on the total number of tasks and the quantity.

(CRM6) At least one computer-readable medium may be configured as described in any of paragraphs (CRM1) through (CRM5), and may be further encoded with additional instructions which, when executed by the at least one processor, further cause the computing system to determine a total number of tasks, including the first task and the second task, that were indicated in a message broadcasted to multiple individuals, to determine a quantity of the total number of tasks that have been completed, and to determine the parameter further based at least in part on the total number of tasks and the quantity.

(CRM7) At least one computer-readable medium may be configured as described in any of paragraphs (CRM1) through (CRM6), and may be further encoded with additional instructions which, when executed by the at least one processor, further cause the computing system to send a request to the resource to identify one or more other tasks that are associated with the first task.

(CRM8) At least one computer-readable medium may be configured as described in any of paragraphs (CRM1) through (CRM7), and may be further encoded with additional instructions which, when executed by the at least one processor, further cause the computing system to determine an initiation time of the first notification, to determine a deadline for completing the first task, and to determine the parameter further based at least in part on the initiation time, the deadline, and a current time.

(CRM9) At least one computer-readable medium may be configured as described in any of paragraphs (CRM1) through (CRM8), and may be further encoded with additional instructions which, when executed by the at least one processor, further cause the computing system to cause the indication to be presented at least in part by altering at least one feature of the first notification presented on a display screen of the first client device to indicate the urgency level.

(CRM10) At least one computer-readable medium may be configured as described in any of paragraphs (CRM1) through (CRM9), and may be further encoded with additional instructions which, when executed by the at least one processor, further cause the computing system to cause the indication to be presented at least in part by altering a manner in which the first notification is presented on a display screen of the first client device to indicate the urgency level.

(CRM11) At least one non-transitory, computer-readable medium may be encoded with instructions which, when executed by at least one processor included in a computing system, cause the computing system to send a notification to a client device, the notification indicating a first task to be performed with respect to a resource accessible to the client device, to determine an initiation time of the notification, to determine a deadline for completing the first task, to determine a parameter indicating an urgency level of the first task, the parameter being based at least in part on the initiation time, the deadline, and a current time, and to cause an indication of the urgency level to be presented on the client device.

(CRM12) At least one computer-readable medium may be configured as described in paragraph (CRM11), and may be further encoded with additional instructions which, when executed by the at least one processor, further cause the computing system to cause the indication to be presented at least in part by altering at least one feature of the notification presented on a display screen of the client device to indicate the urgency level.

(CRM13) At least one computer-readable medium may be configured as described in paragraph (CRM11) or paragraph (CRM12), and may be further encoded with additional instructions which, when executed by the at least one processor, further cause the computing system to cause the indication to be presented at least in part by altering a manner in which the notification is presented on a display screen of the client device to indicate the urgency level.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    sending, by a computing system, a first notification to a first client device, the first notification indicating a first task to be performed by a first user with respect to a resource accessible to the computing system;
    identifying, by the computing system, a group of tasks that includes at least the first task and a second task of a second user with respect to the resource;
    determining that the second user has completed the second task;
    determining, by the computing system, a total number of tasks included in the group;
    determining, by the computing system, a first quantity of the total number of tasks that have been completed or a second quantity of the total number of tasks that have not yet been completed;
    after the first notification has been sent to the first client device and based at least in part on (A) the total number of tasks and (B) the first quantity or the second quantity, setting a value of a parameter associated with the first task to indicate an increased urgency level of the first task; and
    based at least in part on the value of the parameter, altering a manner in which the first notification is presented on a display screen of the first client device to indicate the increased urgency level of the first task.

2. The method of claim 1, wherein the first notification further includes at least one user interface element corresponding to a first action to be taken with respect to the first task.

3. The method of claim 1, further comprising:
    sending a second notification to a second client device, the second notification indicating the second task;
    determining that at least one feature of the second notification is identical to at least one feature of the first notification; and
    determining to include the second task in the group based at least in part on the at least one feature of the second notification being identical to the at least one feature of the first notification.

4. The method of claim 1, further comprising:
    receiving information from the resource indicating that the second task is associated with the first task; and
    determining to include the second task in the group based at least in part on the information received from the resource.

5. The method of claim 4, further comprising:
    sending, by the computing system, a request to the resource to identify one or more other tasks that are associated with the first task; and
    receiving the information in response to the request.

6. The method of claim 4, further comprising:
    determining an initiation time of the first notification; and
    determining a deadline for completing the first task;
    wherein setting the value of the parameter is further based at least in part on the initiation time, the deadline, and a current time.

7. The method of claim 1, further comprising:
    determining that content of the first notification was broadcasted to multiple individuals;
    determining that a second notification sent to the second user included the content and determining to include the second task in the group based at least in part on the content being included in both the first notification and the second notification.

8. The method of claim 7, further comprising:
determining an initiation time of the first notification; and
determining a deadline for completing the first task;
wherein setting the value of the parameter is further based at least in part on the initiation time, the deadline, and a current time.

9. The method of claim 1, further comprising:
determining an initiation time of the first notification; and
determining a deadline for completing the first task;
wherein setting the value of the parameter is further based at least in part on the initiation time, the deadline, and a current time.

10. The method of claim 1, wherein altering the manner in which the first notification is presented on the display screen further comprises:
altering at least one feature of the first notification presented on the display screen.

11. A computing system, comprising:
at least one processor; and
at least one computer-readable medium encoded with instructions which, when executed by the at least one processor, cause the computing system to:
send a first notification to a first client device, the first notification indicating a first task to be performed by a first user with respect to a resource accessible to the computing system,
determine that content of the first notification was broadcasted to multiple individuals,
determine that a second notification sent to a second user included the content, the second notification indicating, a second task of a second user with respect to the resource,
determine to include at least the first task and the second task in the group based at least in part on the content being included in both the first notification and the second notification,
determine that the second user has completed the second task,
determine a total number of tasks included in the group,
determine a first quantity of the total number of tasks that have been completed or a second quantity of the total number of tasks that have not yet been completed,
after the first notification has been sent to the first client device and based at least in part on (A) the total number of tasks and (B) the first quantity or the second quantity, set a value of a parameter associated with the first task to indicate an increased urgency level of the first task, and
based at least in part on the value of the parameter, cause an indication of the increased urgency level of the first task to be presented on the first client device.

12. The computing system of claim 11, wherein the at least one computer-readable medium is further encoded with additional instructions which, when executed by the at least one processor, further cause the computing system to:
receive information from the resource indicating that the second task is associated with the first task; and
determine to include the second task in the group based at least in part on the information received from the resource.

13. The computing system of claim 11, wherein the at least one computer-readable medium is further encoded with additional instructions which, when executed by the at least one processor, further cause the computing system to:
determine an initiation time of the first notification;
determine a deadline for completing the first task; and
set the value of the parameter further based at least in part on the initiation time, the deadline, and a current time.

14. The computing system of claim 11, wherein the at least one computer-readable medium is further encoded with additional instructions which, when executed by the at least one processor, further cause the computing system to:
send the second notification to a second client device;
determine that at least one feature of the second notification is identical to at least one feature of the first notification; and
determine to include the second task in the group based at least in part on the at least one feature of the second notification being identical to the at least one feature of the first notification.

15. At least one non-transitory computer-readable medium encoded with instructions which, when executed by at least one processor of a computing system, cause the computing system to:
send a first notification to a first client device, the first notification indicating a first task to be performed by a first user with respect to a resource accessible to the computing system;
identify a group of tasks that includes at least the first task and a second task of a second user with respect to the resource;
determine that the second user has completed the second task;
determine a total number of tasks included in the group;
determine a first quantity of the total number of tasks that have been completed or a second quantity of the total number of tasks that have not yet been completed;
after the first notification has been sent to the first client device and based at least in part on (A) the total number of tasks and (B) the first quantity or the second quantity, set a value of a parameter associated with the first task to indicate an increased urgency level of the first task; and
based at least in part on the value of the parameter, alter a manner in which the first notification is presented on a display screen of the first client device to indicate the increased urgency level of the first task.

16. The at least one non-transitory computer-readable medium of claim 15, further encoded with additional instructions which, when executed by the at least one processor, further cause the computing system to:
receive information from the resource indicating that the second task is associated with the first task; and
determine to include the second task in the group based at least in part on the information received from the resource.

17. The at least one non-transitory computer-readable medium of claim 15, further encoded with additional instructions which, when executed by the at least one processor, further cause the computing system to:
determine that content of the first notification was broadcasted to multiple individuals;
determine that a second notification sent to the second user included the content; and
determine to include the second task in the group based at least in part on the content being included in both the first notification and the second notification.

18. The at least one non-transitory computer-readable medium of claim 15, further encoded with additional instructions which, when executed by the at least one processor, further cause the computing system to:
- determine an initiation time of the first notification;
- determine a deadline for completing the first task; and
- set the value of the parameter further based at least in part on the initiation time, the deadline, and a current time.

19. The at least one non-transitory computer-readable medium of claim 16, further encoded with additional instructions which, when executed by the at least one processor, further cause the computing system to:
- determine an initiation time of the first notification;
- determine a deadline for completing the first task; and
- set the value of the parameter further based at least in part on the initiation time, the deadline, and a current time.

20. The at least one non-transitory computer-readable medium of claim 17, further encoded with additional instructions which, when executed by the at least one processor, further cause the computing system to:
- determine an initiation time of the first notification;
- determine a deadline for completing the first task; and
- set the value of the parameter further based at least in part on the initiation time, the deadline, and a current time.

\* \* \* \* \*